(12) United States Patent
Nasu et al.

(10) Patent No.: US 8,234,419 B1
(45) Date of Patent: Jul. 31, 2012

(54) STORAGE SYSTEM AND METHOD OF CONTROLLING SAME TO ENABLE EFFECTIVE USE OF RESOURCES

(75) Inventors: Hiroshi Nasu, Yokohama (JP); Wataru Okada, Yokohama (JP); Hirokazu Ikeda, Yamato (JP)

(73) Assignee: Hitachi, Ltd., Toyko (JP)

( * ) Notice: Subject to any disclaimer, the term of this patent is extended or adjusted under 35 U.S.C. 154(b) by 0 days.

(21) Appl. No.: 13/063,392

(22) PCT Filed: Feb. 25, 2011

(86) PCT No.: PCT/JP2011/001089
§ 371 (c)(1),
(2), (4) Date: Mar. 10, 2011

(51) Int. Cl.
*G06F 3/00* (2006.01)

(52) U.S. Cl. .......................................... 710/39
(58) Field of Classification Search ................. 710/1, 39
See application file for complete search history.

(56) References Cited

U.S. PATENT DOCUMENTS
2009/0049241 A1   2/2009   Ohno et al.

FOREIGN PATENT DOCUMENTS
| EP | 1 727 033 A1 | 11/2006 |
| EP | 1857918 A2 * | 11/2007 |
| JP | 2004-005370 | 1/2004 |

OTHER PUBLICATIONS

PCT International Search Report and Written Opinion on application No. PCT/JP2011/001089 mailed Sep. 15, 2011; 10 pages.

* cited by examiner

*Primary Examiner* — Richard B Franklin
(74) *Attorney, Agent, or Firm* — Foley & Lardner LLP

(57) ABSTRACT

This invention enables resources included in a storage system to be effectively used. In a storage system 1 including a host computer 3, a first storage apparatus 10 that receives a data I/O request from the host computer 3, the second storage apparatus 10, and including a function of external attachment processing for managing the entity of a first logical volume of the first storage apparatus 10 in a second logical volume of the second storage apparatus 10, when a problem occurs in performance of the first storage apparatus 10, the external attachment processing is released, while external attachment release processing is performed in which path for accessing from the host computer 3 the second logical volume is switched to allow direct access from the host computer 3 to the second logical volume. When the problem in performance of the first storage apparatus 10 is solved, path switching is performed again to resume the external attachment processing.

13 Claims, 33 Drawing Sheets

[Fig. 1]
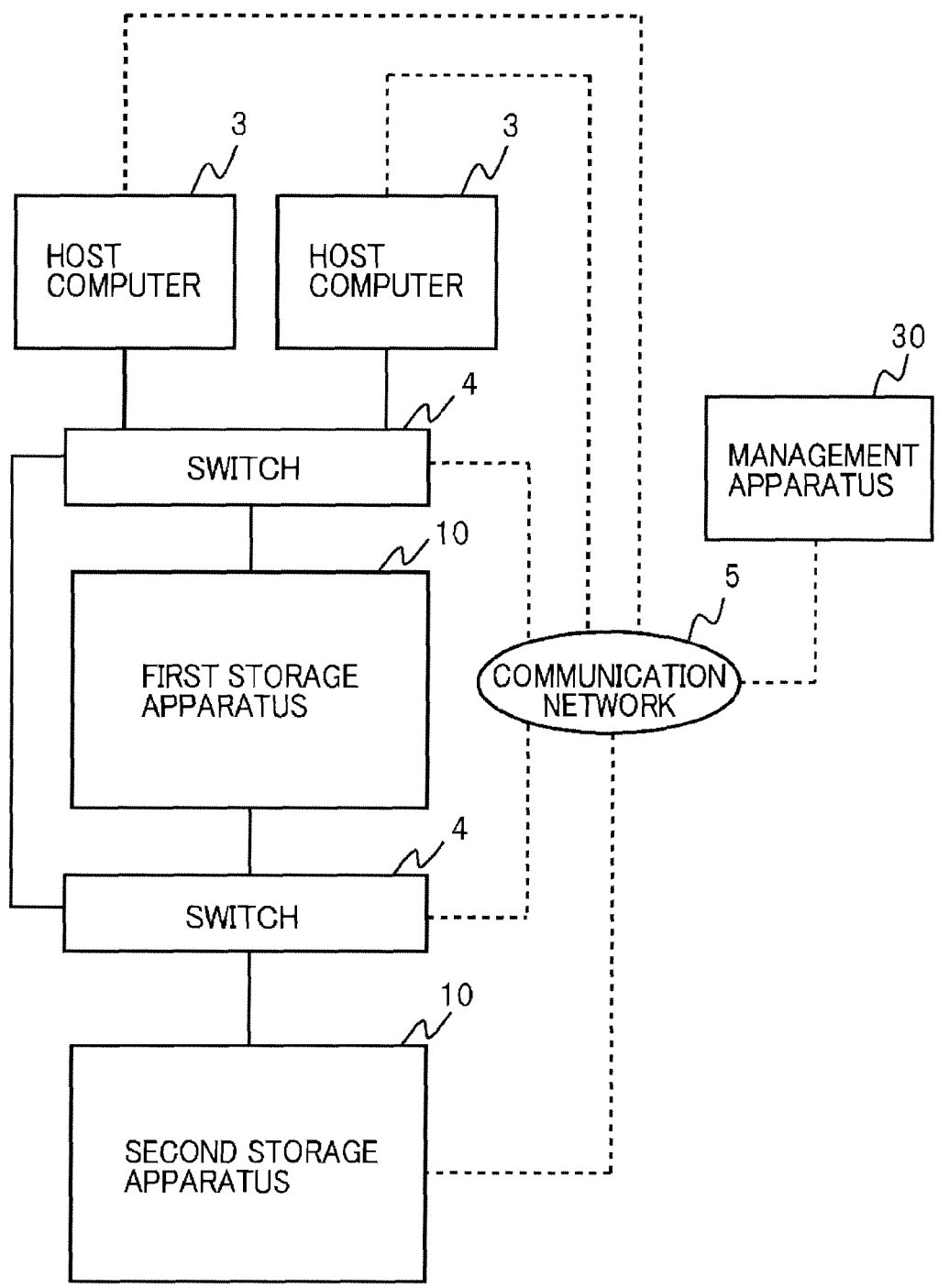

[Fig. 2]
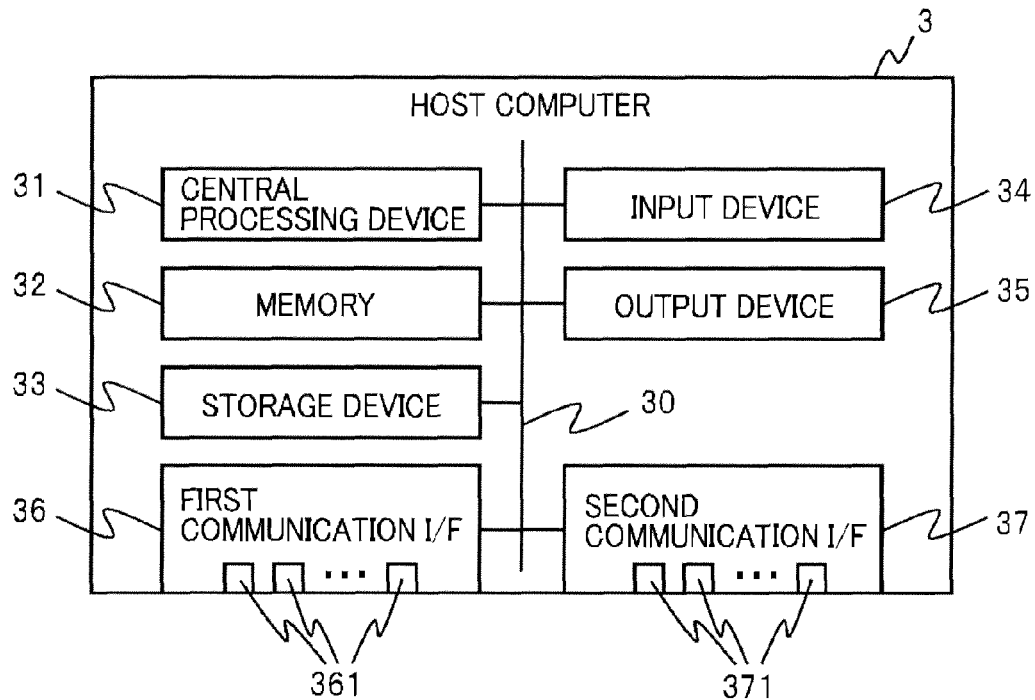
[Fig. 3]
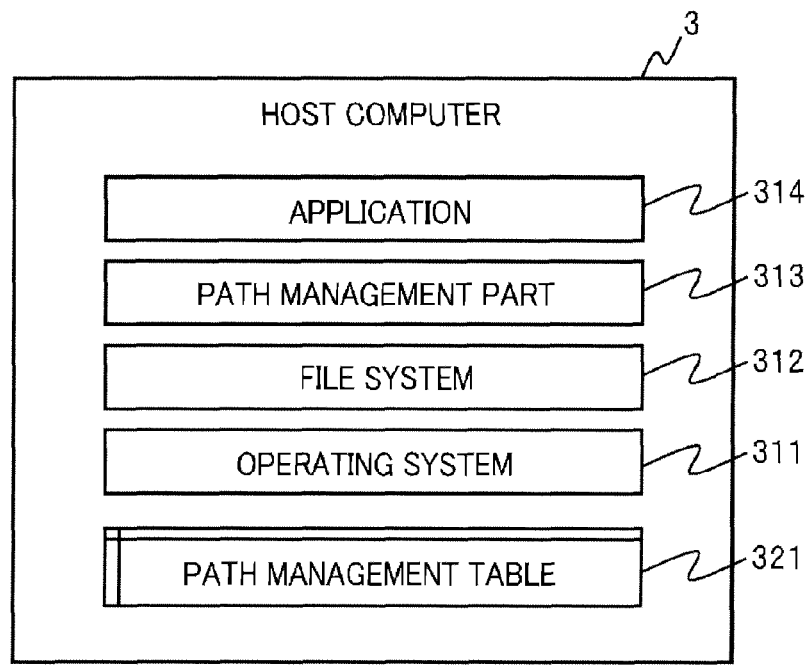

[Fig. 4]

PATH MANAGEMENT TABLE 321

| PATH ID | HOST PORT ID | WWN (HOST COMPUTER) | STORAGE ID | LUN |
|---------|--------------|---------------------|------------|------|
| 0 | 0 | 10:00:00:aa:aa:aa | 0 | 0000 |
| 1 | 1 | 20:00:00:ab:ab:ab | 0 | 0001 |
| : | : | : | : | : |

3211  3212  3213  3214  3215

[Fig. 5]
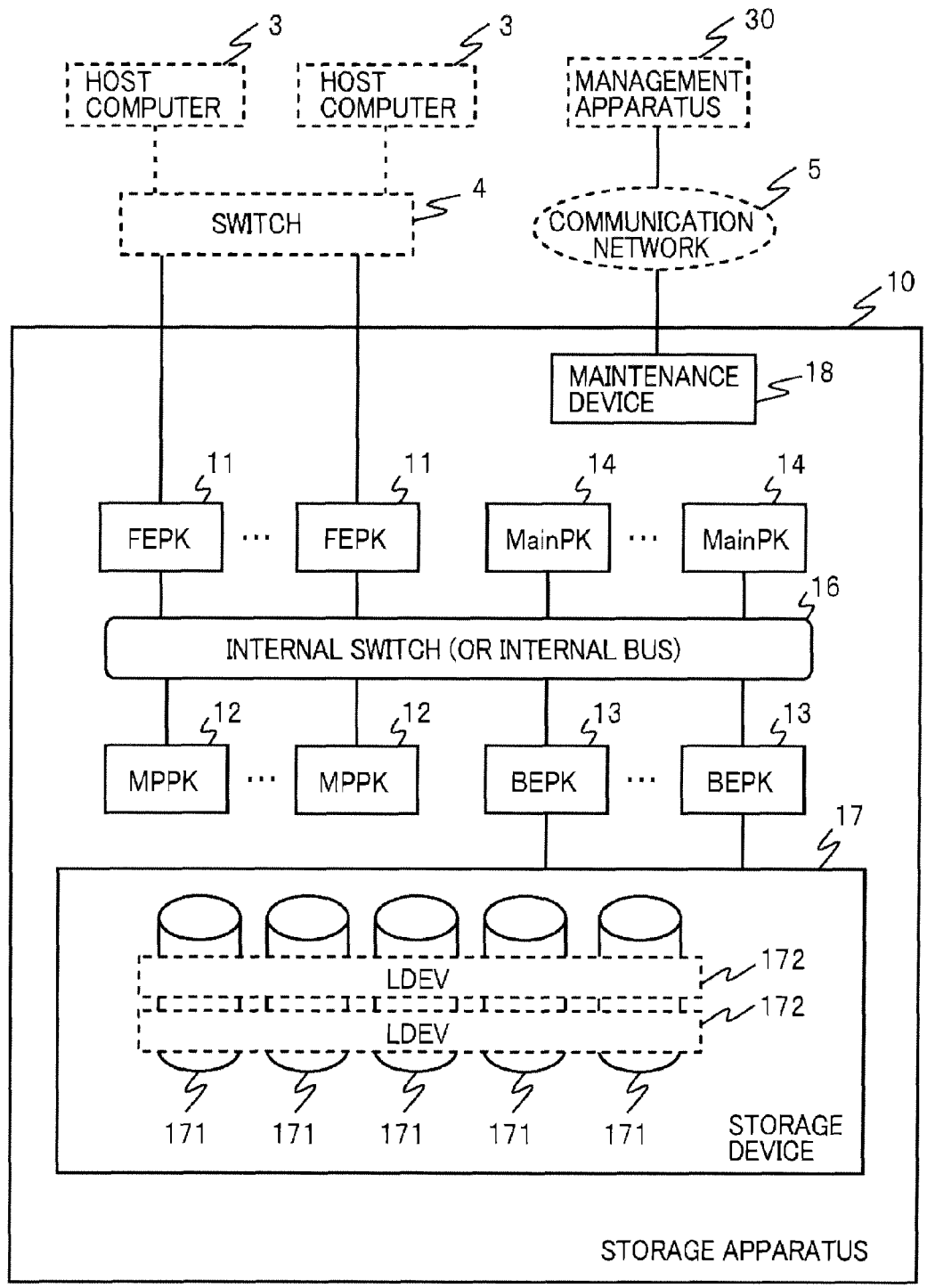

[Fig. 6]
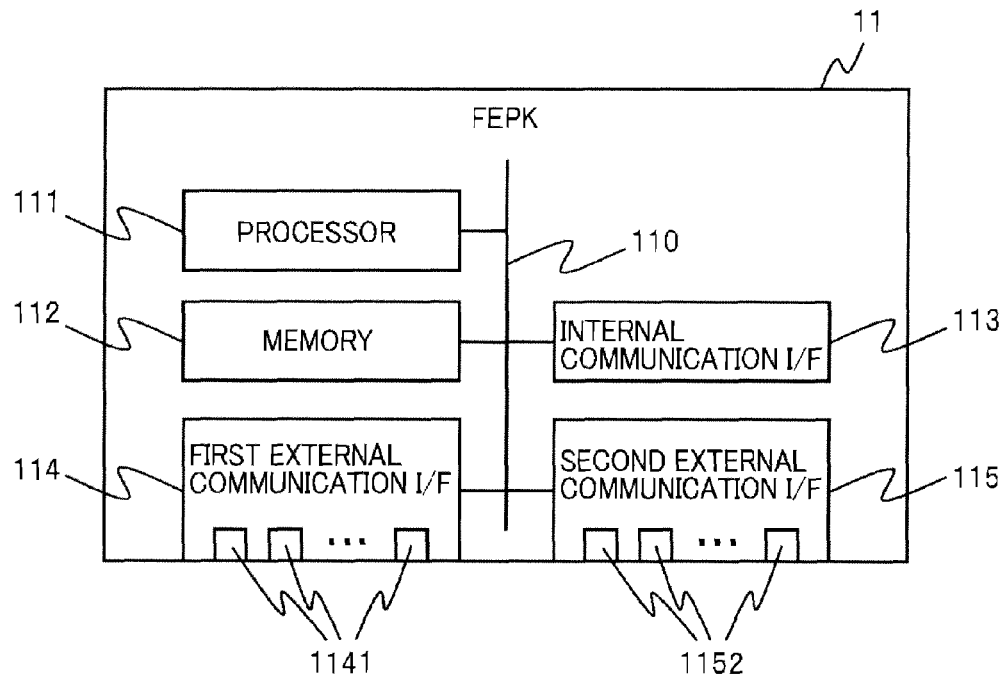
[Fig. 7]
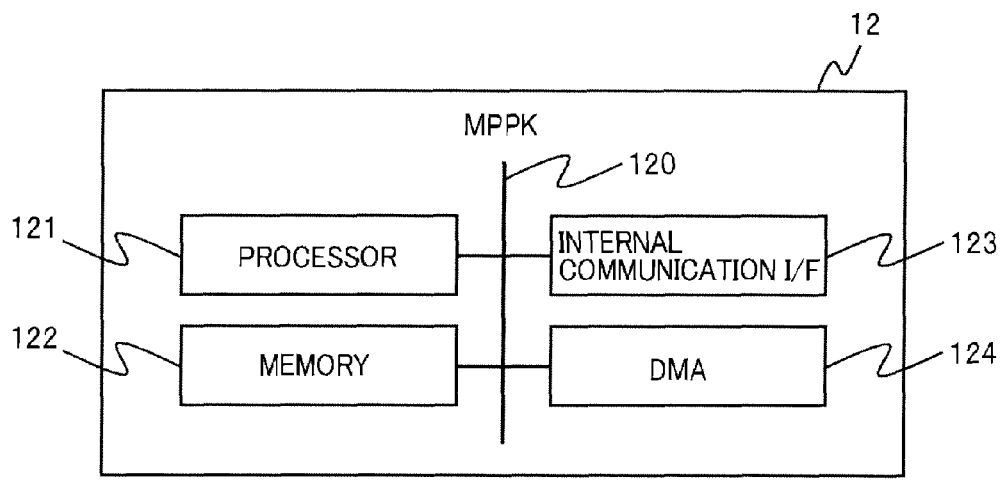

[Fig. 8]
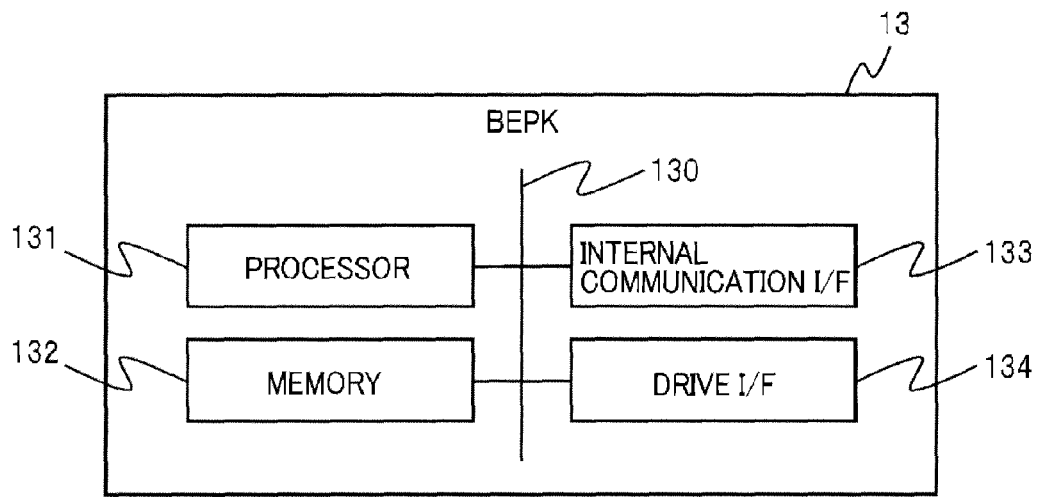
[Fig. 9]
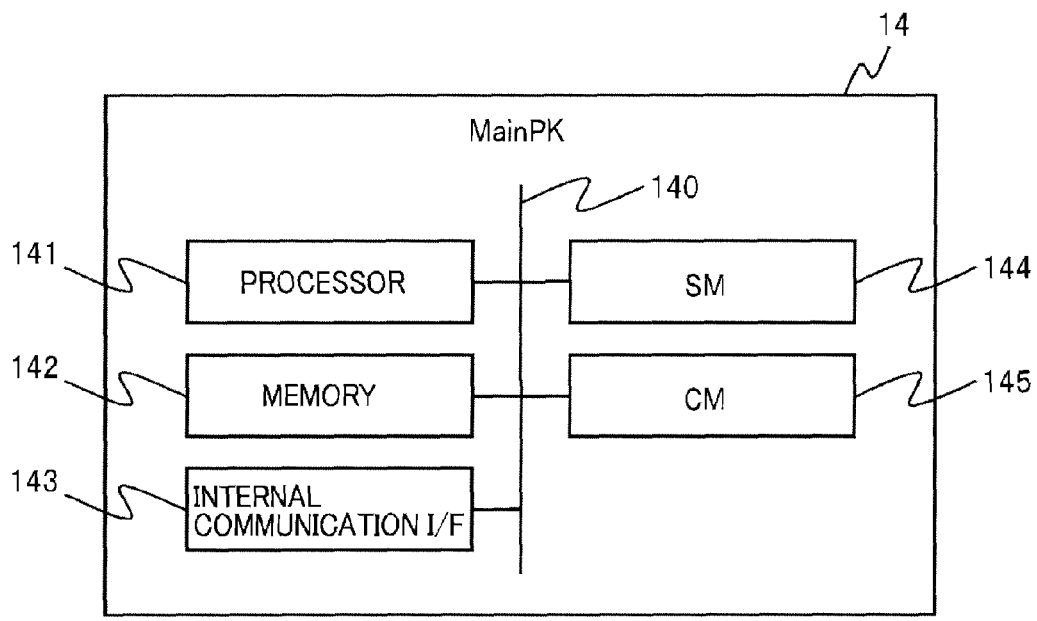

[Fig. 10]
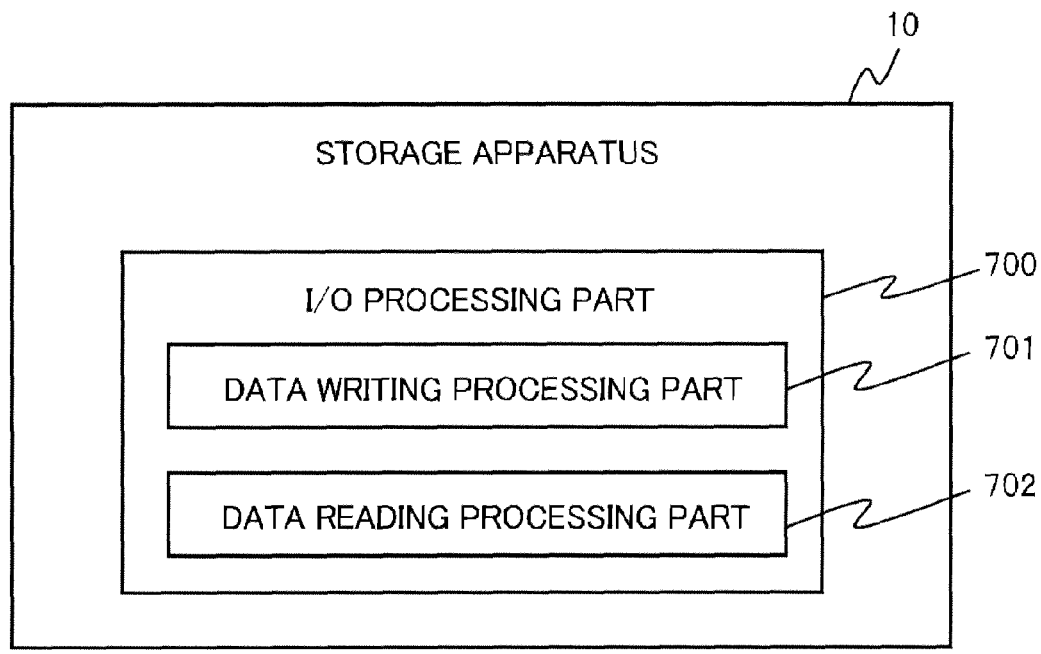

[Fig. 11]
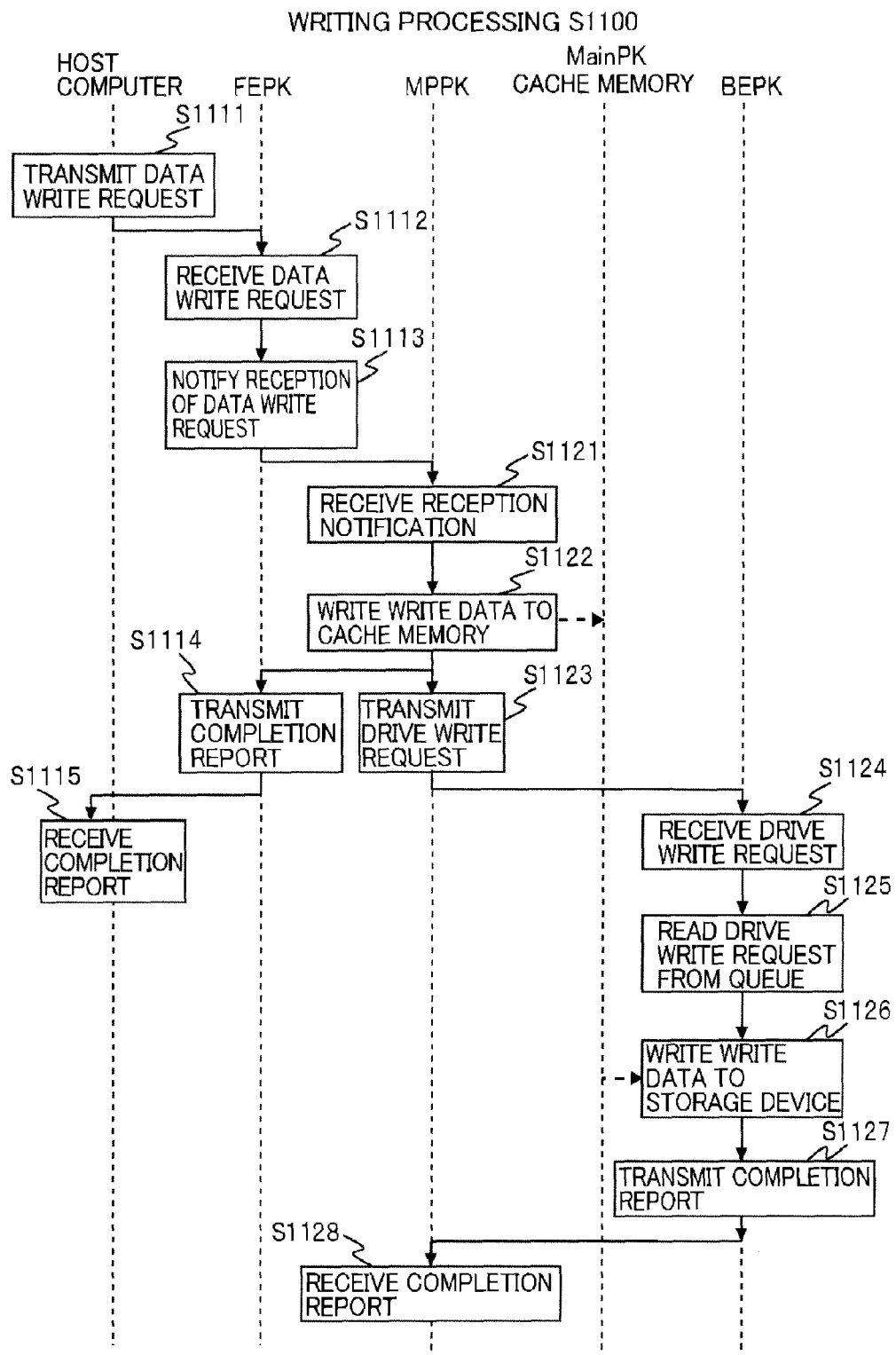

[Fig. 12]
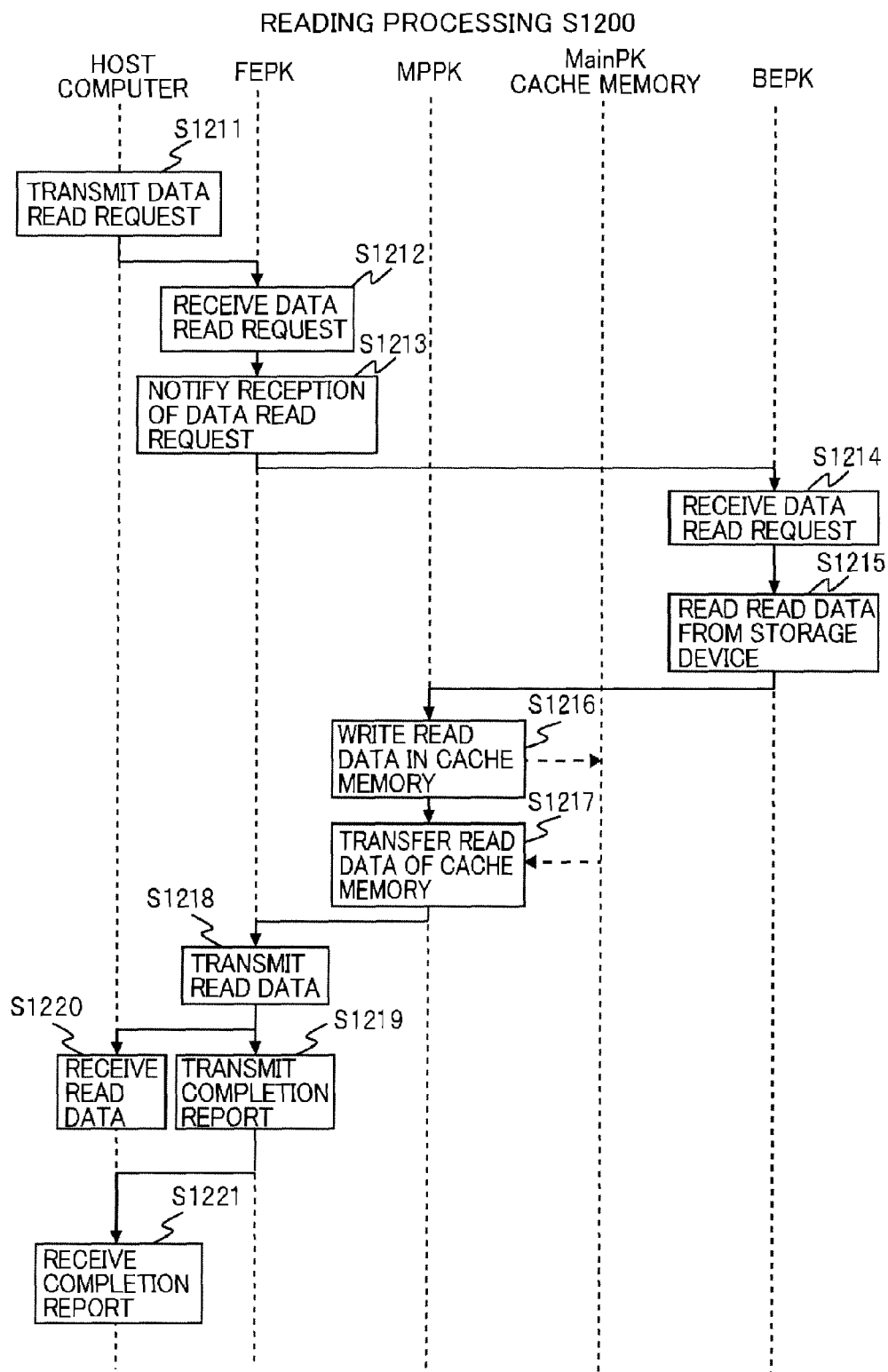

[Fig. 13]
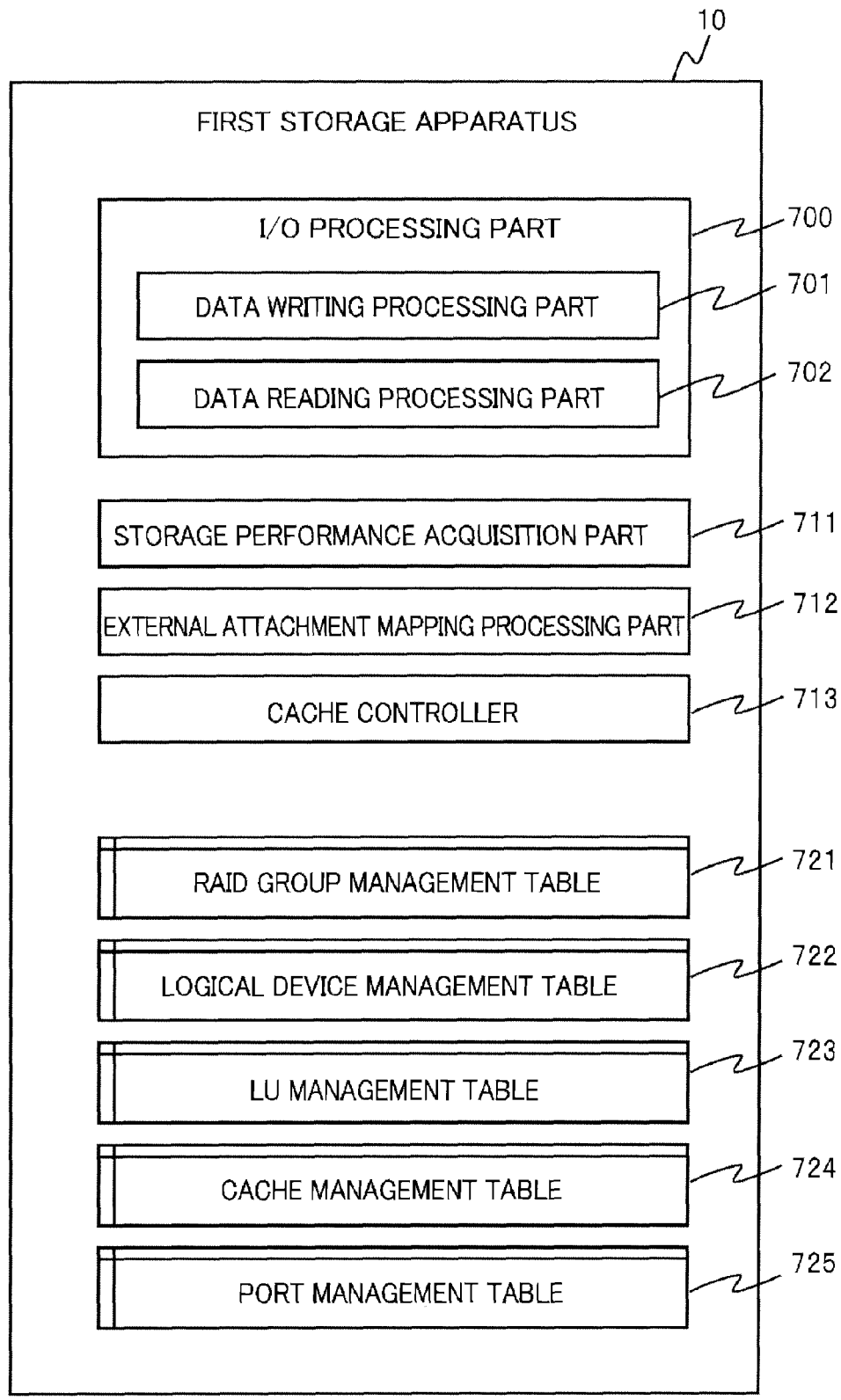

[Fig. 14]

RAID GROUP MANAGEMENT TABLE 721

| RAID GROUP ID | STORAGE DRIVE ID | RAID LEVEL |
|---|---|---|
| RG0 | HDD00 | RAID6(6D+2P) |
| RG0 | HDD01 | RAID6(6D+2P) |
| : | : | : |
| RG1 | HDD10 | RAID5(3D+1P) |
| RG1 | HDD11 | RAID5(3D+1P) |
| : | : | : |

[Fig. 15]

LOGICAL DEVICE MANAGEMENT TABLE 722

| LOGICAL DEVICE ID | RAID GROUP ID | START ADDRESS | ENDING ADDRESS | CACHE MODE |
|---|---|---|---|---|
| LDEV000 | RG0 | 00000000 | 00099999 | ON |
| LDEV001 | RG0 | 00100000 | 00299999 | ON |
| LDEV002 | RG1 | 00000000 | 00999999 | OFF |
| : | : | : | : | : |

[Fig. 16]

LU MANAGEMENT TABLE 723

| LUN (7231) | LOGICAL DEVICE ID (7232) | CAPACITY (kB) (7233) | SPECIFIC INFORMATION (7234) | MAPPING STORAGE INFORMATION (STORAGE ID) (7235) |
|---|---|---|---|---|
| 0000 | LDEV000 | 25600000 | Vendor ID:HHH<br>Product ID:AAA | 1:0000 |
| 0001 | LDEV001 | 51200000 | Vendor ID:HHH<br>Product ID:AAB | : |
| 0002 | LDEV002 | 256000000 | Vendor ID:HHH<br>Product ID:BBA | : |
| : | : | : | : | : |

[Fig. 17]

CACHE MANAGEMENT TABLE 724

| CACHE ADDRESS (7241) | LOGICAL DEVICE ID (7242) | BLOCK ADDRESS (7243) |
|---|---|---|
| 0000 | LDEV000 | 00000300 |
| : | : | : |

[Fig. 18]

PORT MANAGEMENT TABLE 725

| STORAGE PORT ID (7251) | WWN (7252) |
|---|---|
| 0000 | 10:10:10:01:12:23 |
| : | : |

[Fig. 19]
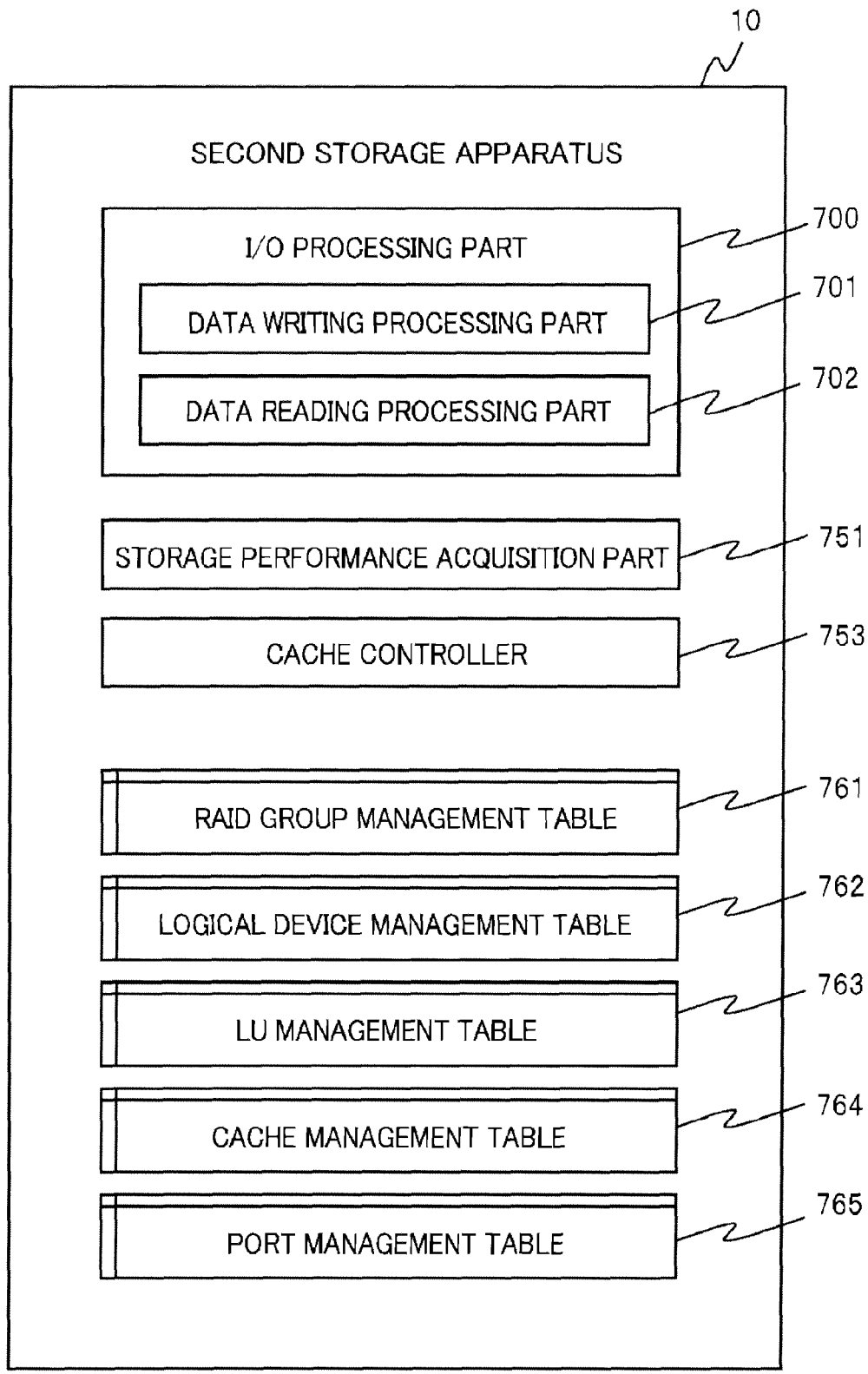

[Fig. 20]

RAID GROUP MANAGEMENT TABLE 761

| RAID GROUP ID (7611) | STORAGE DRIVE ID (7612) | RAID LEVEL (7613) |
|---|---|---|
| RG0 | HDD00 | RAID6(6D+2P) |
| RG0 | HDD01 | RAID6(6D+2P) |
| ⋮ | ⋮ | ⋮ |
| RG1 | HDD10 | RAID5(3D+1P) |
| RG1 | HDD11 | RAID5(3D+1P) |
| ⋮ | ⋮ | ⋮ |

[Fig. 21]

LOGICAL DEVICE MANAGEMENT TABLE 762

| LOGICAL DEVICE ID (7621) | RAID GROUP ID (7622) | START ADDRESS (7623) | ENDING ADDRESS (7624) | CACHE MODE (7625) |
|---|---|---|---|---|
| LDEV000 | RG0 | 00000000 | 00099999 | ON |
| LDEV001 | RG0 | 00100000 | 00299999 | ON |
| LDEV002 | RG1 | 00000000 | 00999999 | OFF |
| ⋮ | ⋮ | ⋮ | ⋮ | ⋮ |

[Fig. 22]

LU MANAGEMENT TABLE 763

| LUN | LOGICAL DEVICE ID | CAPACITY (kB) | SPECIFIC INFORMATION |
|---|---|---|---|
| 0000 | LDEV000 | 25600000 | Vendor ID:HHH<br>Product ID:AAC |
| 0001 | LDEV001 | 51200000 | Vendor ID:HHH<br>Product ID:AAC |
| 0002 | LDEV002 | 256000000 | Vendor ID:HHH<br>Product ID:BBC |
| ⋮ | ⋮ | ⋮ | ⋮ |

CACHE MANAGEMENT TABLE 764

| CACHE ADDRESS | LOGICAL DEVICE ID | BLOCK ADDRESS |
|---|---|---|
| 0000 | LDEV000 | 00005200 |
| ⋮ | ⋮ | ⋮ |

PORT MANAGEMENT TABLE 765

| STORAGE PORT ID | WWN |
|---|---|
| 0000 | 10:00:00:aa:aa:aa |
| ⋮ | ⋮ |

7651, 7652

[Fig. 25]
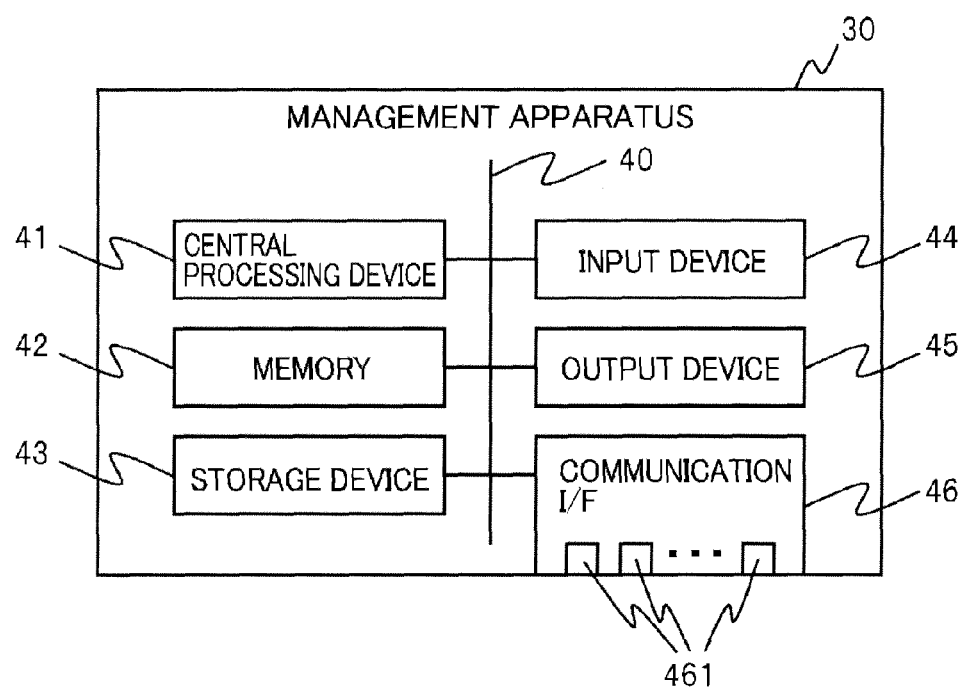

[Fig. 26]
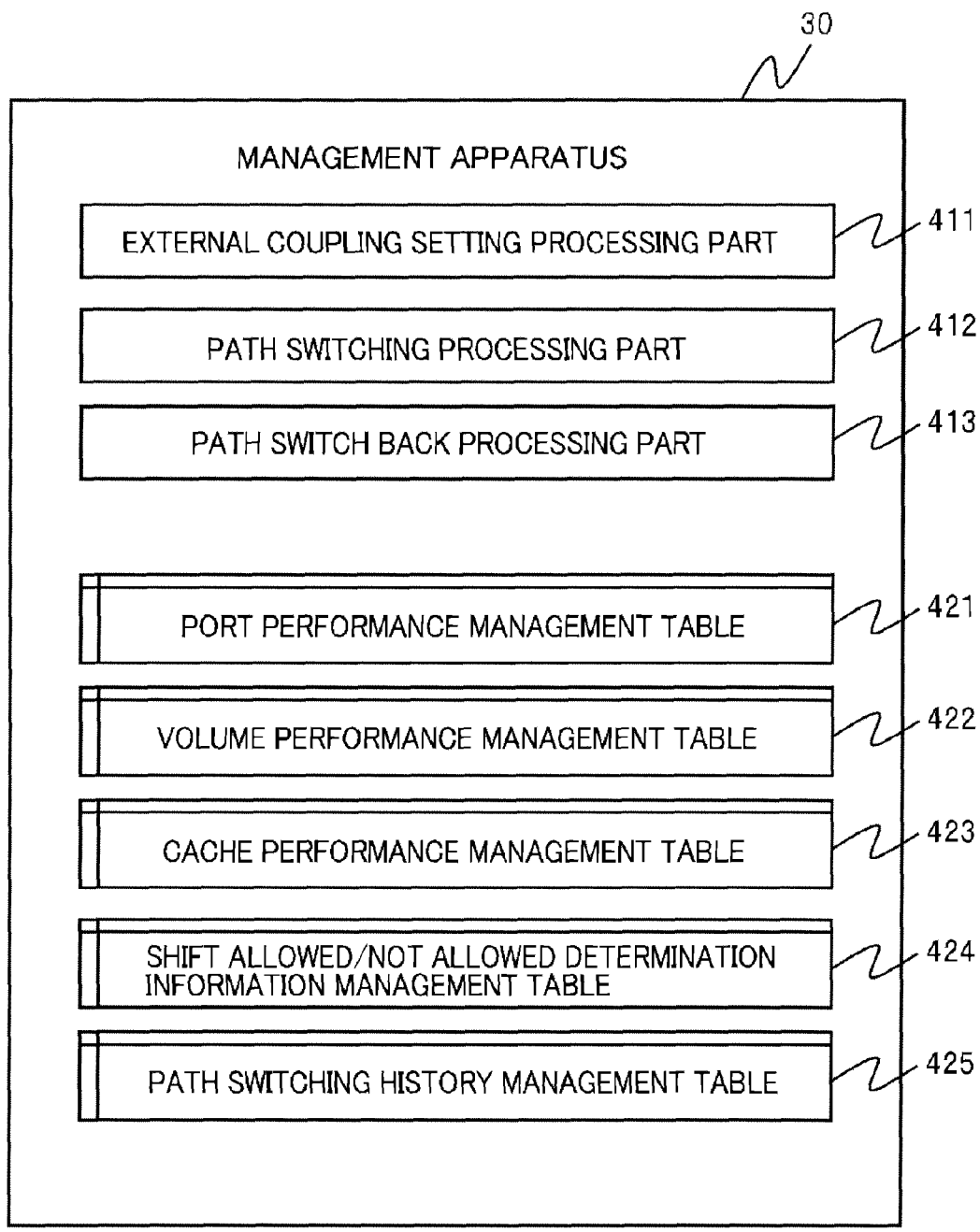

[Fig. 27]

PORT PERFORMANCE MANAGEMENT TABLE 421

| STORAGE ID 4211 | PORT ID 4212 | MAXIMUM IOPS 4213 | IOPS MEASURED VALUE 4214 |
|---|---|---|---|
| 0 | 0 | 400 | 300 |
| 0 | 1 | 400 | 200 |
| : | : | : | : |

[Fig. 28]

VOLUME PERFORMANCE MANAGEMENT TABLE 422

| STORAGE ID 4221 | LUN 4222 | IOPS MEASURED VALUE 4223 | IOPS THRESHOLD VALUE 4224 |
|---|---|---|---|
| 0 | 0000 | 250 | 200 |
| 0 | 0001 | 100 | 150 |
| : | : | : | : |

[Fig. 29]

CACHE PERFORMANCE MANAGEMENT TABLE 423

| STORAGE ID 4231 | CACHE UTILIZATION RATIO(%) 4232 | CACHE UTILIZATION RATIO THRESHOLD VALUE(%) 4233 |
|---|---|---|
| 0 | 65 | 80 |
| : | : | : |

[Fig. 30]

SHIFT ALLOWED/NOT ALLOWED
DETERMINATION INFORMATION MANAGEMENT TABLE 424

| STORAGE ID | LUN | I/O STOP ALLOWED/ NOT ALLOWED | PATH SWITCHING ALLOWED/NOT ALLOWED | STORAGE FUNCTIONS STOP ALLOWED/NOT ALLOWED | BACKUP OPERATION CHANGE ALLOWED/ NOT ALLOWED |
|---|---|---|---|---|---|
| 0 | 0000 | ALLOWED | ALLOWED | ALLOWED | ALLOWED |
| 0 | 0001 | NOT ALLOWED | ALLOWED | NOT ALLOWED | ALLOWED |
| : | : | : | : | : | : |

Columns: 4241, 4242, 4243, 4244, 4245, 4246

[Fig. 31]

PATH SWITCHING HISTORY MANAGEMENT TABLE 425

| SWITCHING SOURCE STORAGE ID | SWITCHING SOURCE LUN | SWITCHING DESTINATION STORAGE ID | SWITCHING DESTINATION LUN | SWITCHED DATE/TIME |
|---|---|---|---|---|
| 0 | 0000 | 1 | 0000 | 2011/1/14 12:25:30 |
| : | : | : | : | : |

Columns: 4251, 4252, 4253, 4254, 4255

[Fig. 32]
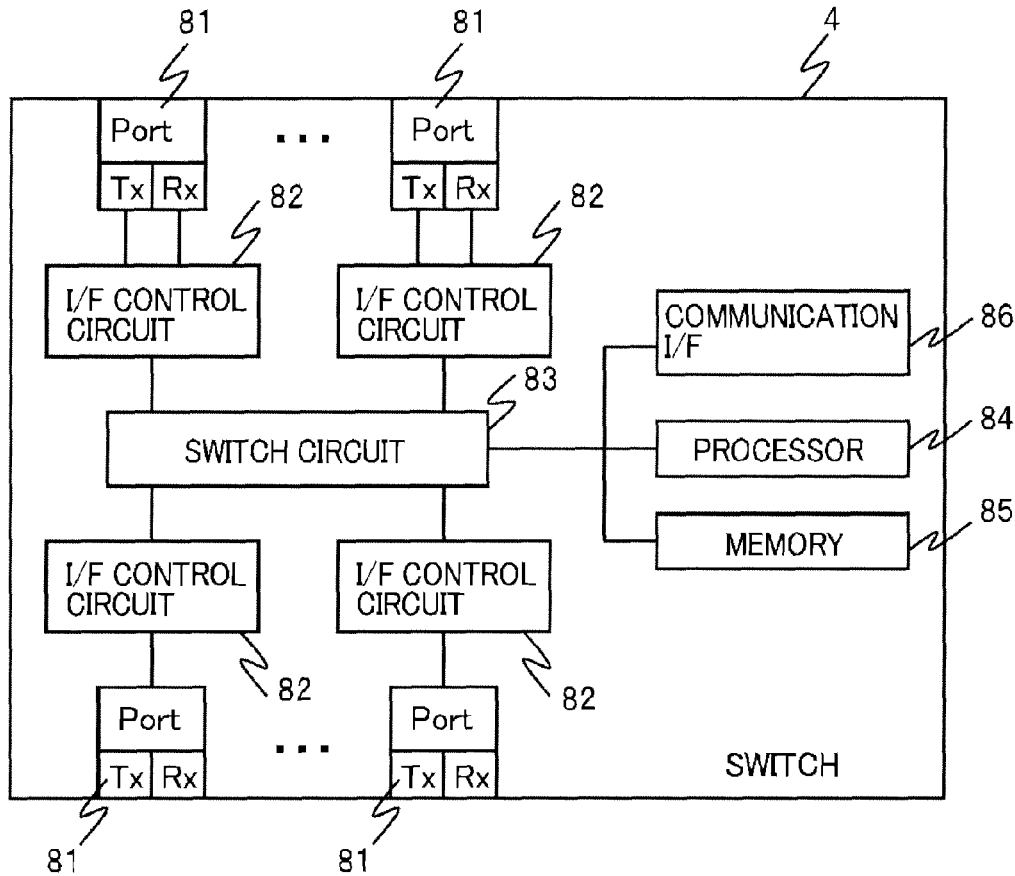
[Fig. 33]
ZONING SETTING TABLE 3300
| ZONE ID | WWN |
|---|---|
| zone0 | 10:00:00:aa:aa:aa |
| zone0 | 20:00:00:ab:ab:ab |
| zone0 | 10:00:00:01:12:23 |
| ⋮ | ⋮ |
| zone1 | 10:00:00:aa:aa:aa |
| ⋮ | ⋮ |

[Fig. 34]
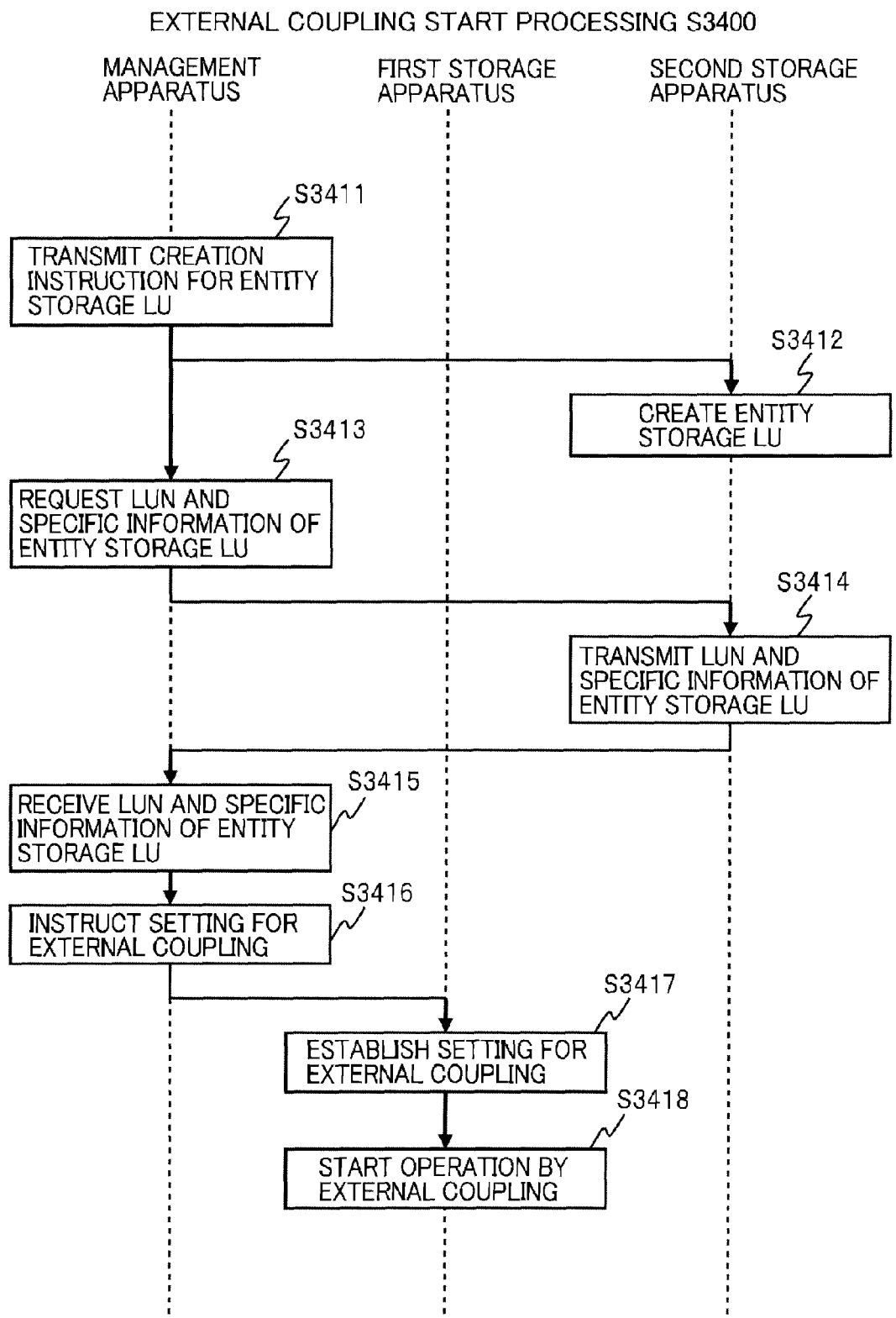

[Fig. 35]
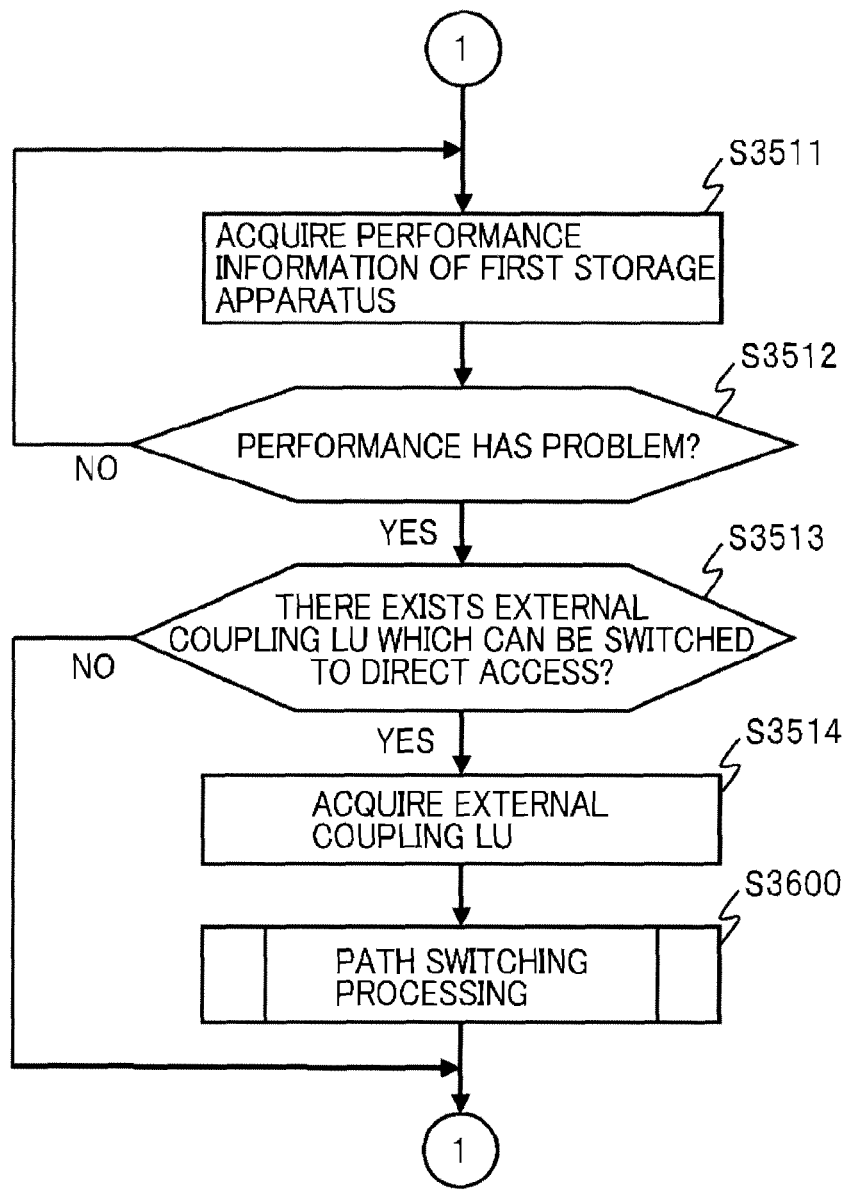

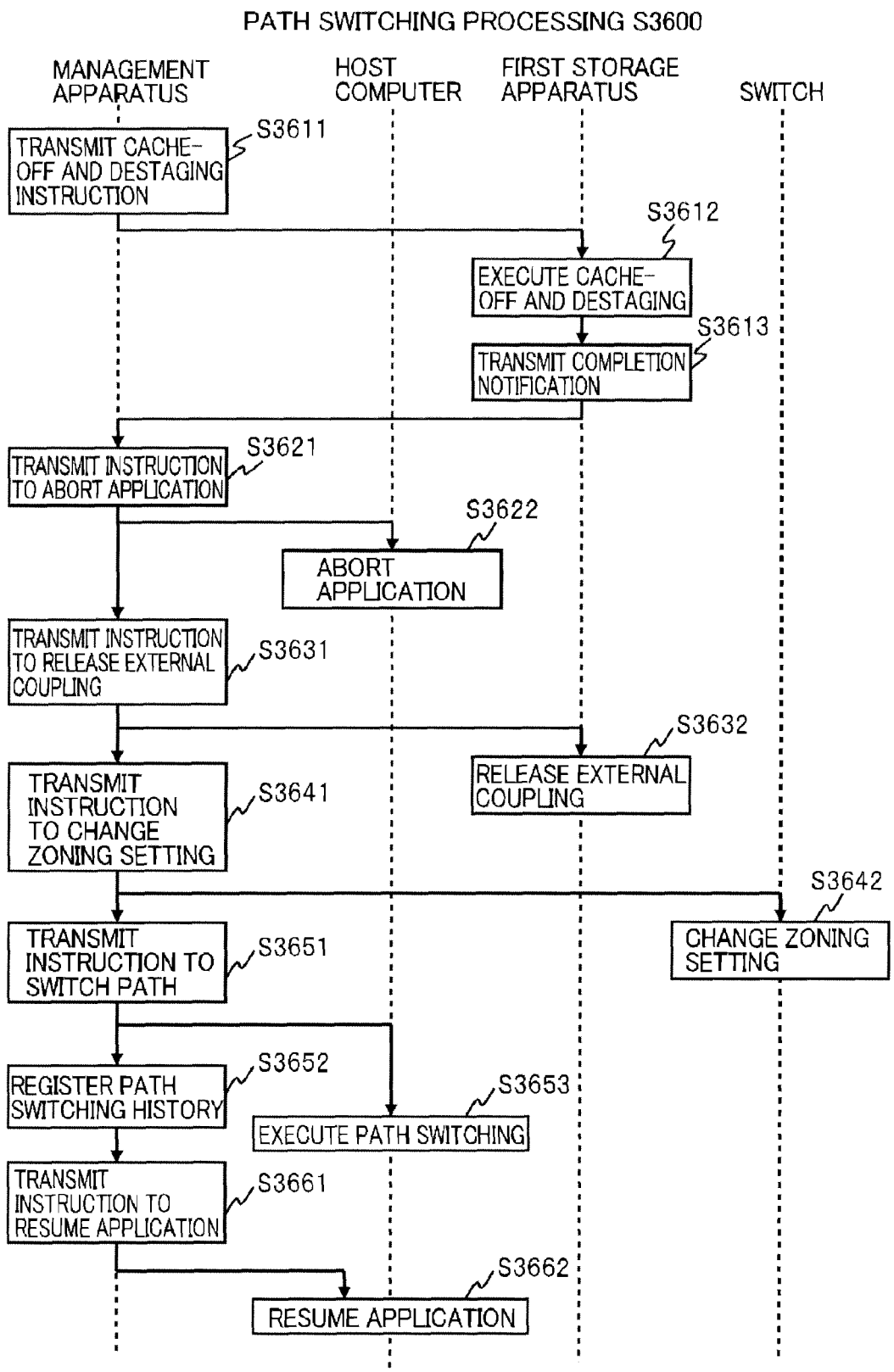
[Fig. 36]

[Fig. 37]
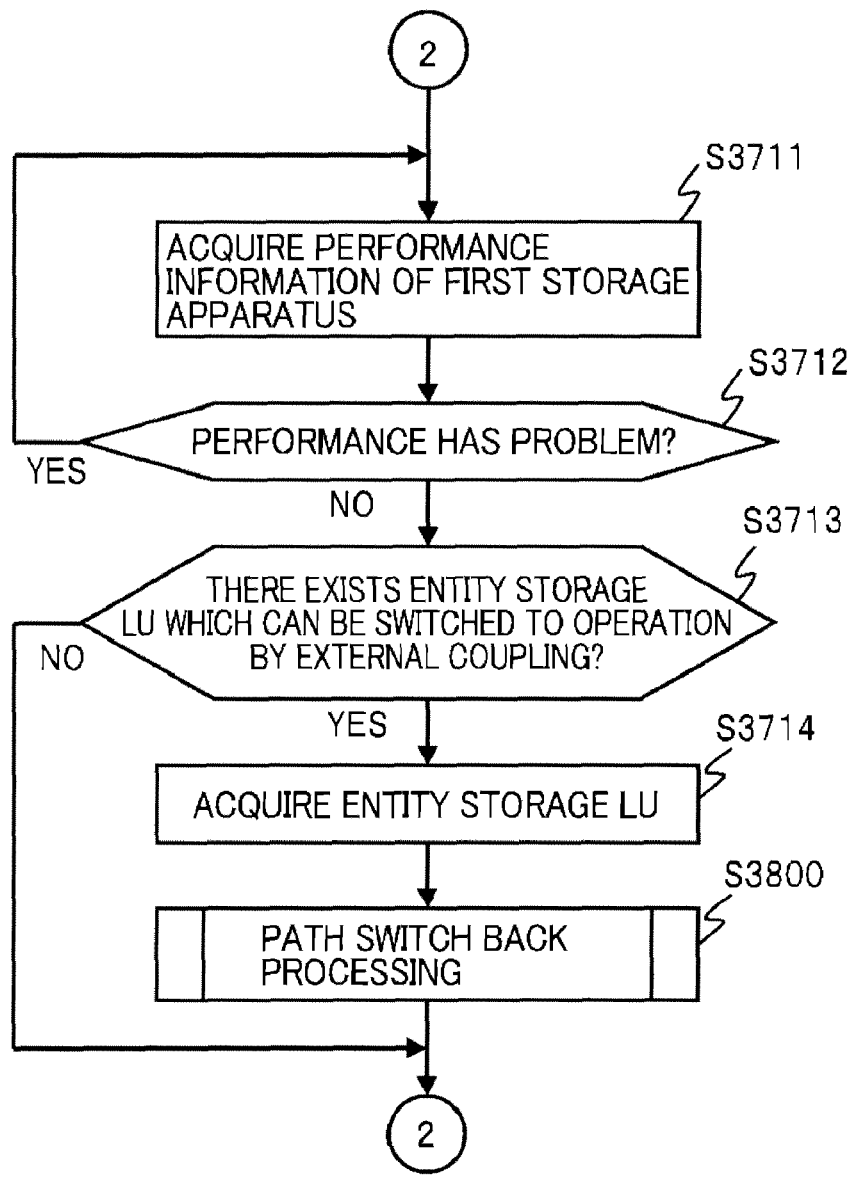

[Fig. 38]
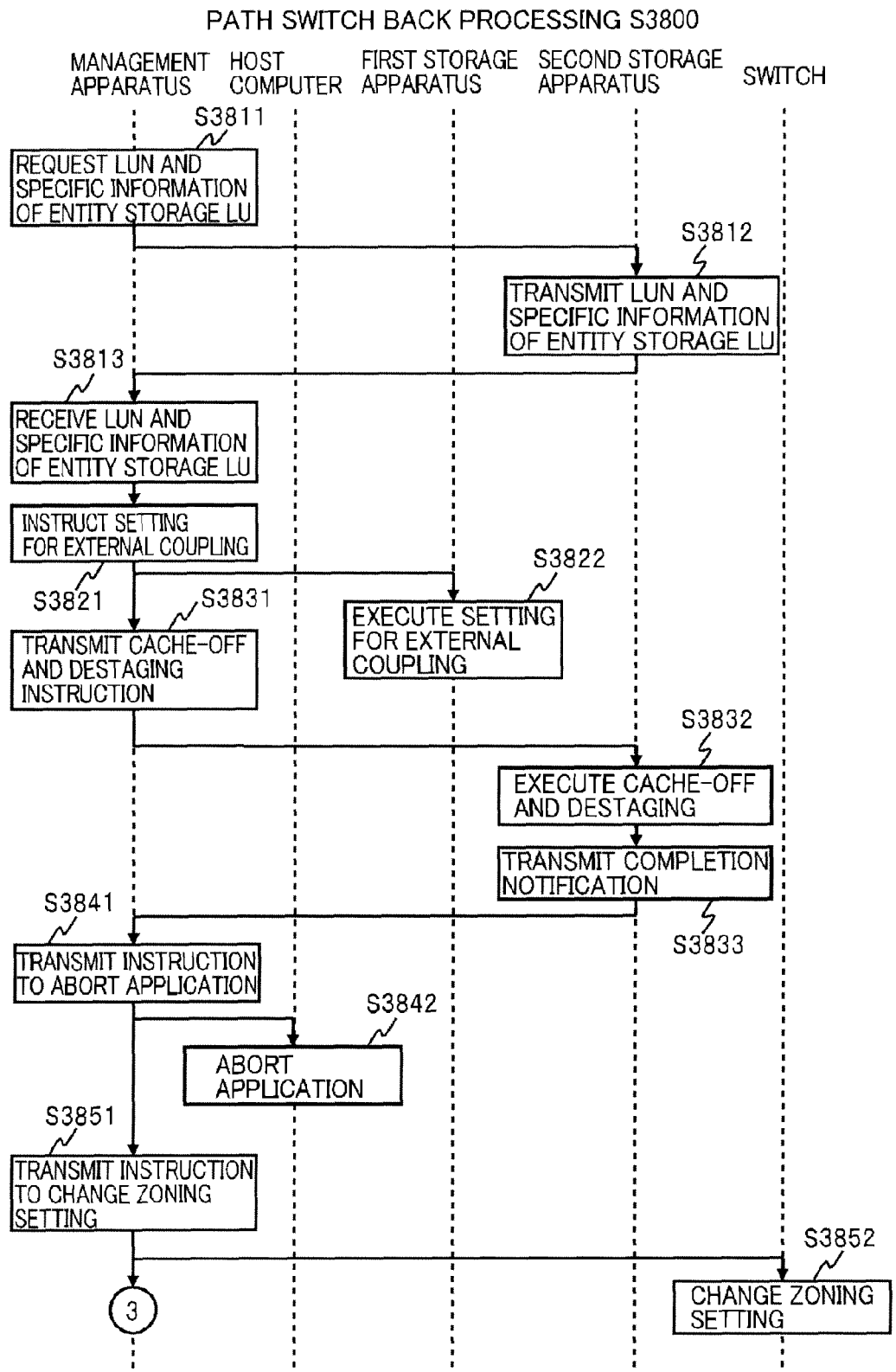

[Fig. 39]
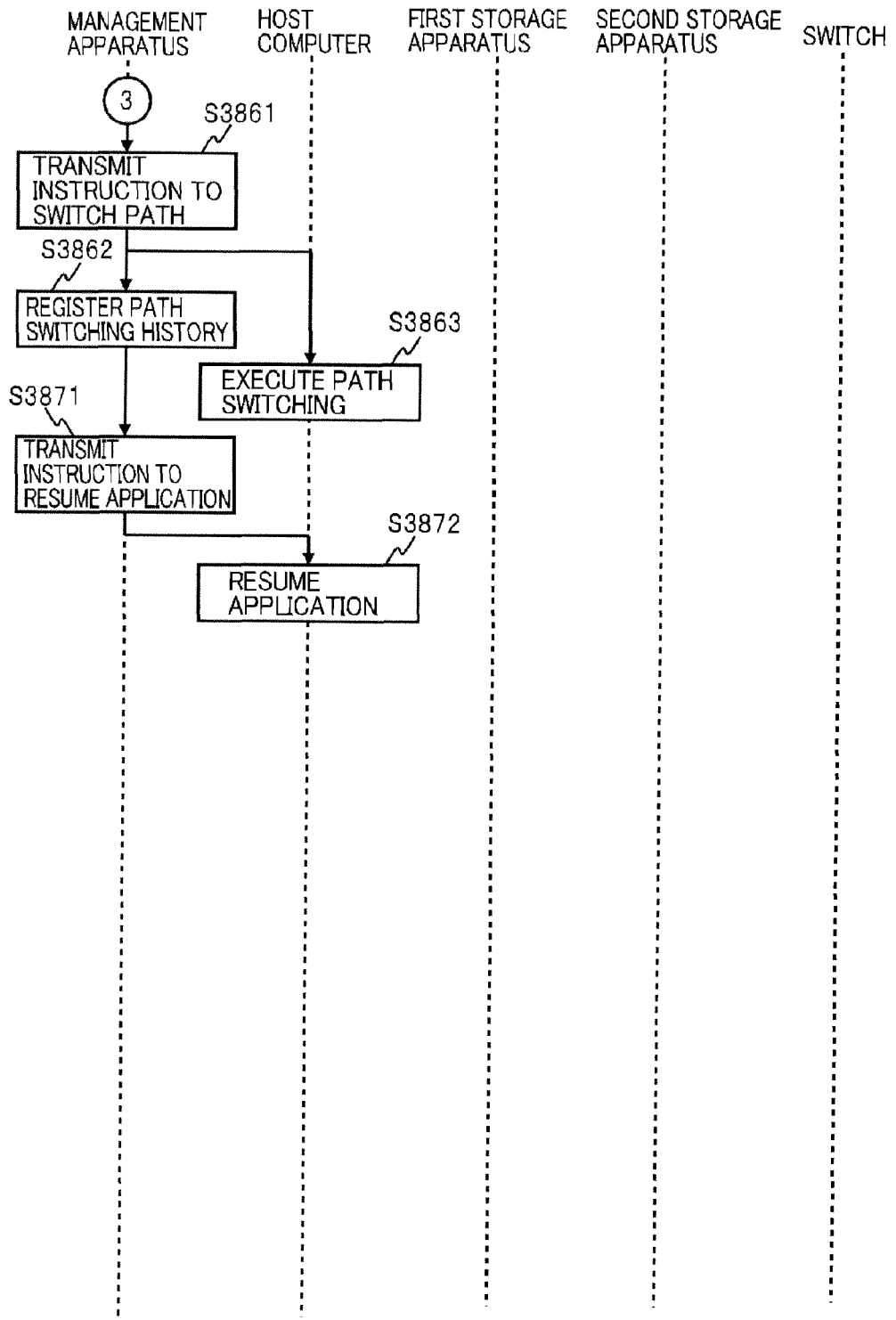

[Fig. 40]
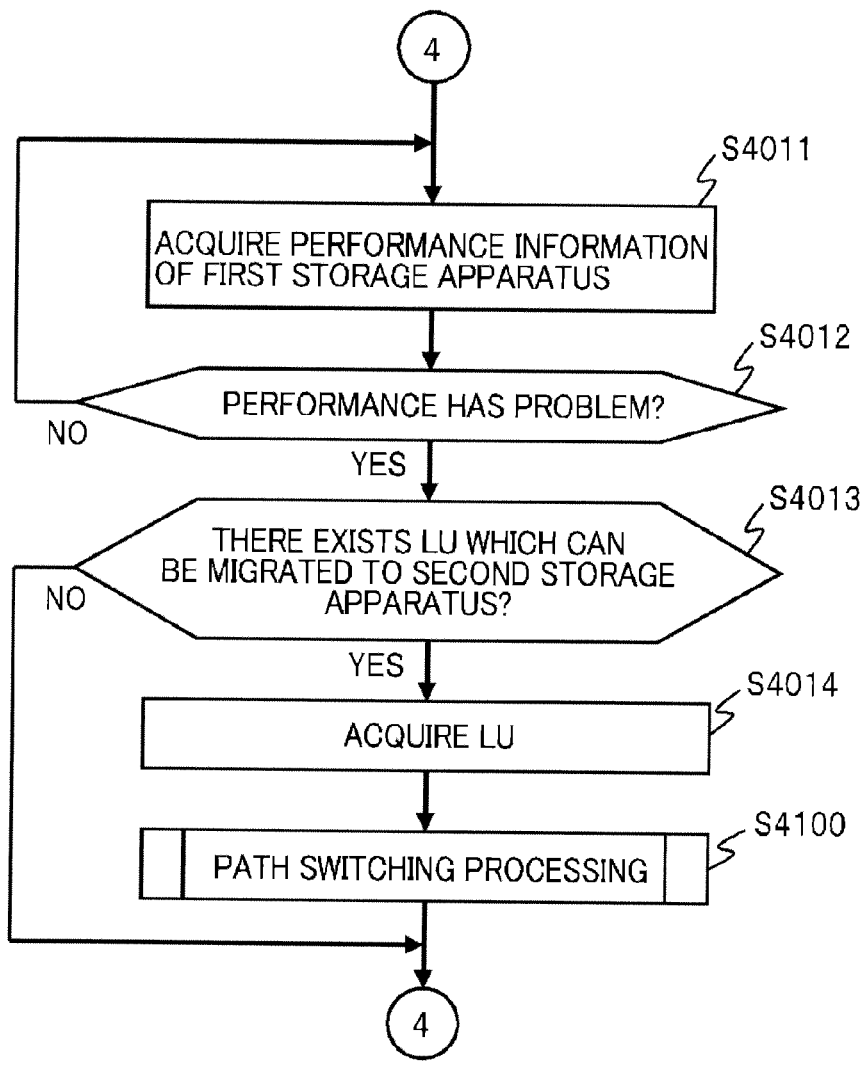

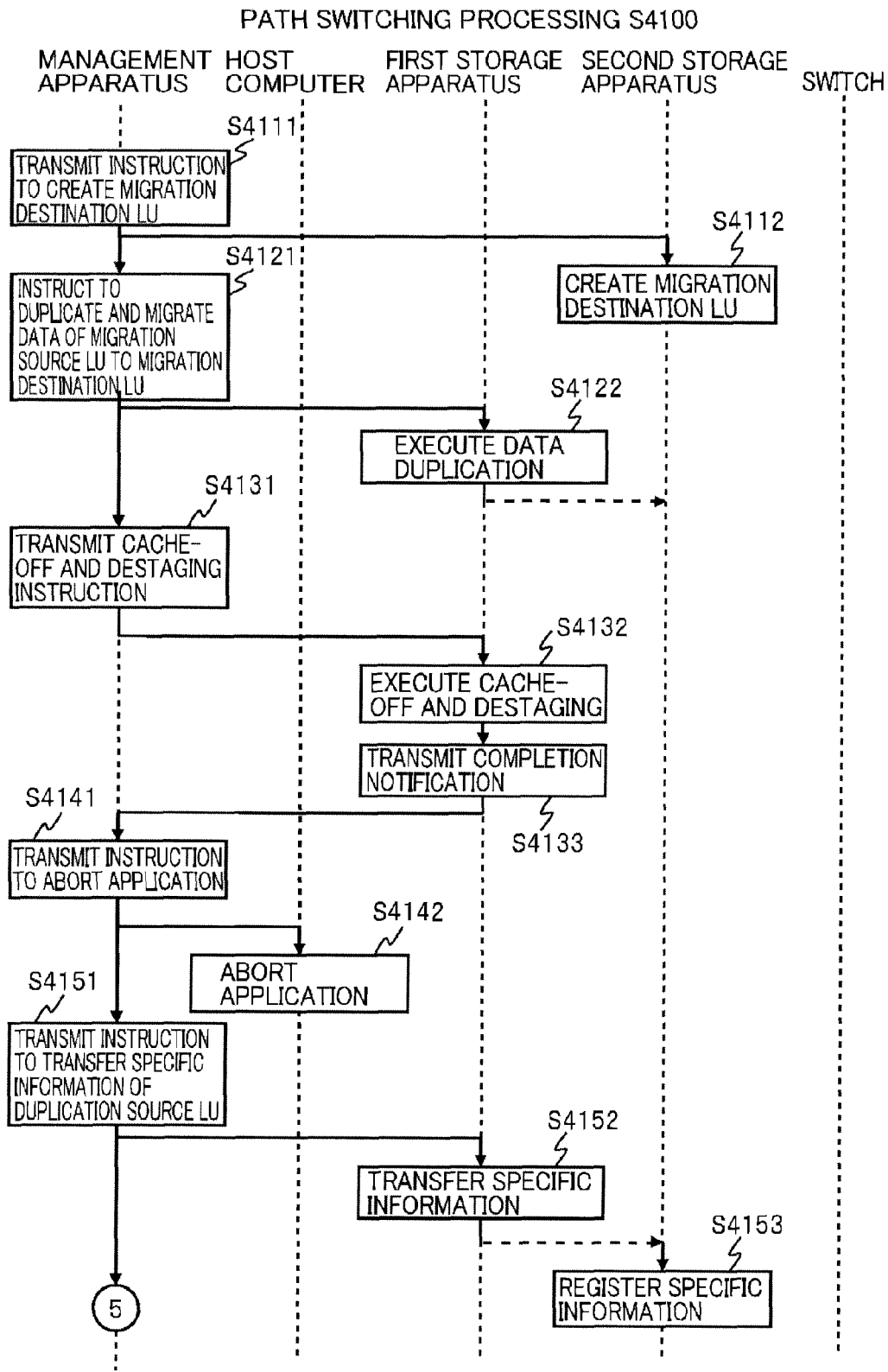

[Fig. 42]
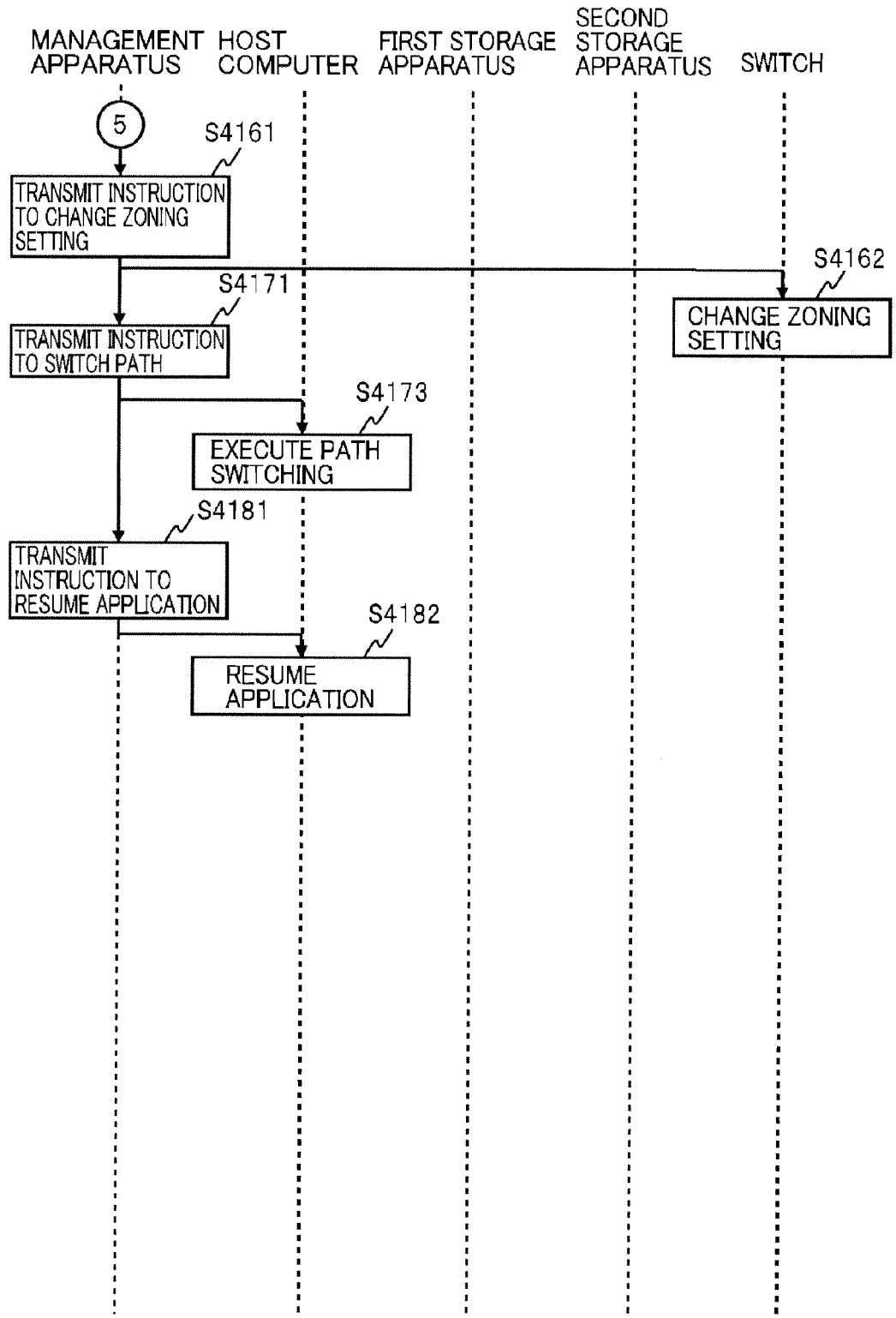

[Fig. 43]
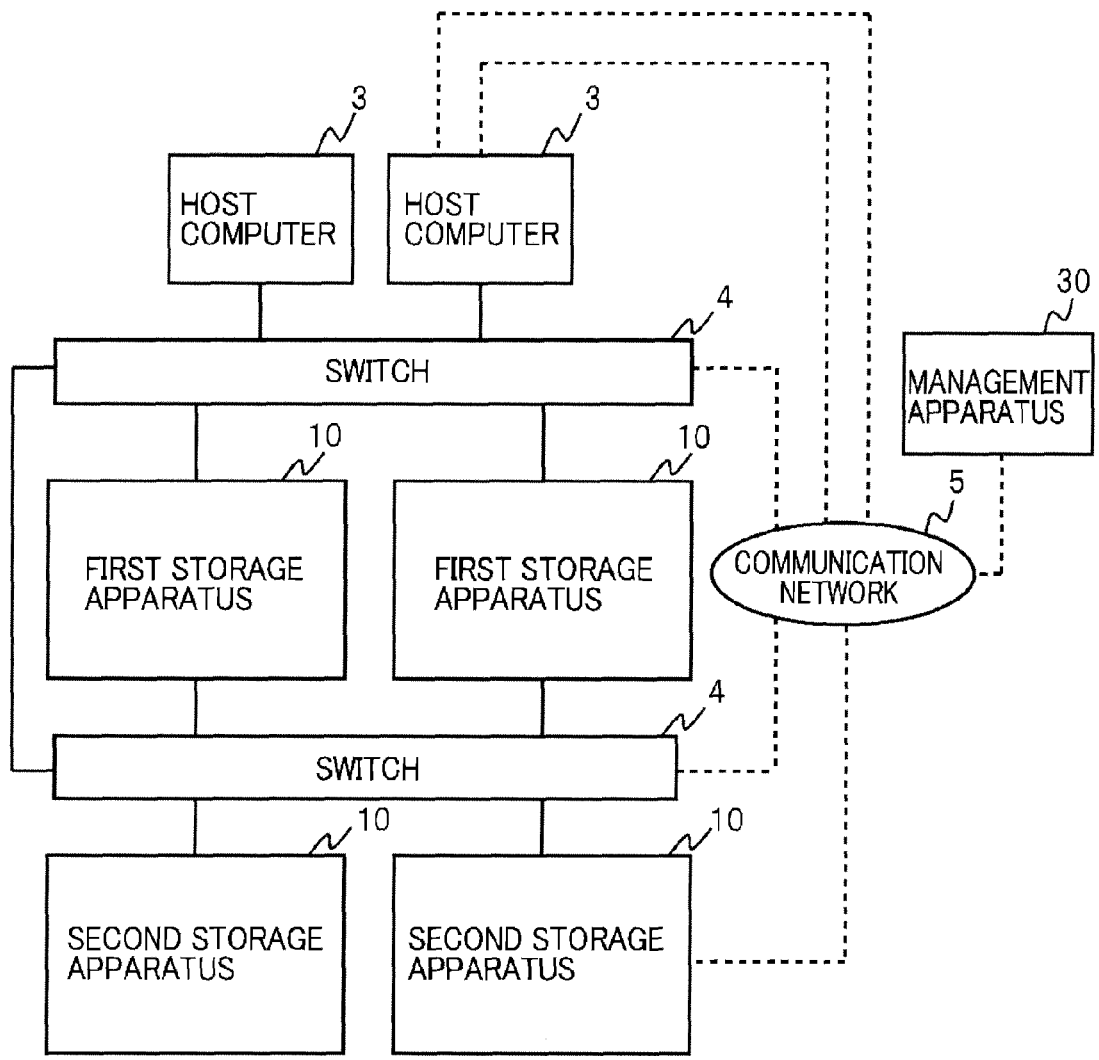

[Fig. 44]
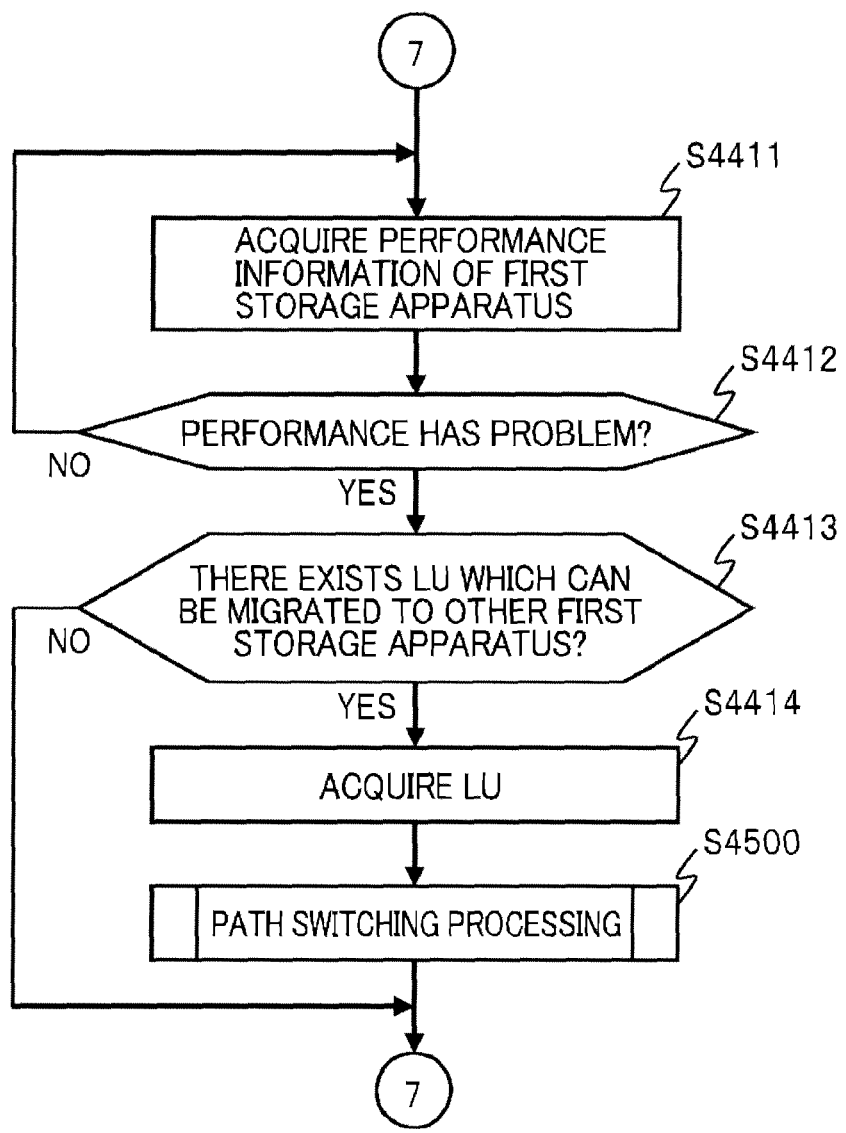

[Fig. 45]
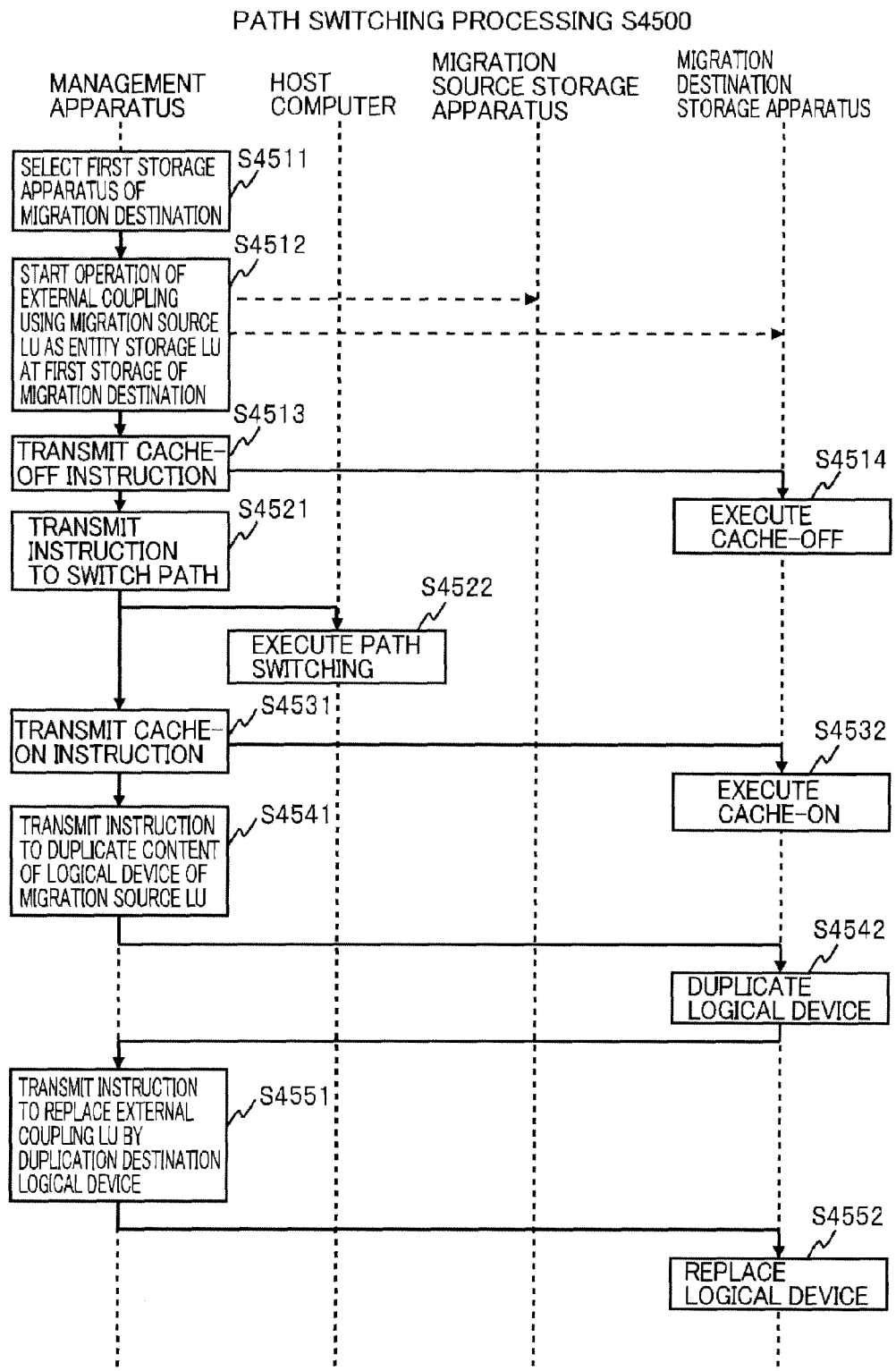

[Fig. 46]

LU ACCESS FREQUENCY MANAGEMENT TABLE 4600

| STORAGE ID (4611) | LUN (4612) | ACCESS FREQUENCY (I/O FREQUENCY/DAY) (4613) |
|---|---|---|
| 0 | 0000 | 90000000 |
| ⋮ | ⋮ | ⋮ |

[Fig. 47]

TIER MANAGEMENT TABLE 4700

| TIER ID (4711) | ACCESS FREQUENCY UPPER LIMIT VALUE (I/O FREQUENCY/DAY) (4712) | ACCESS FREQUENCY LOWER LIMIT VALUE (I/O FREQUENCY/DAY) (4713) |
|---|---|---|
| FIRST TIER |  | 10000000 |
| SECOND TIER | 9999999 | 100000 |
| THIRD TIER | 99999 |  |

STORAGE SYSTEM AND METHOD OF CONTROLLING SAME TO ENABLE EFFECTIVE USE OF RESOURCES

TECHNICAL FIELD

This invention relates to a storage system and a method of controlling a storage system.

BACKGROUND ART

PTL 1 describes the following method of effectively using an existing second storage controller when a storage controller is newly introduced to a data center or the like for the purpose of achieving higher performance and larger capacity. A host computer and a first storage controller are coupled via a first communication path. The first storage controller and a second storage controller are coupled via a second communication path. The first storage controller receives a first data I/O request from the host computer via the first communication path. In the case where the first storage controller determines that the first storage controller is not in charge of the first data I/O request, the first storage controller transmits a second data I/O request corresponding to the first data I/O request to the second storage controller via the second communication path. Then, the second storage controller receives the second data I/O request, and performs data I/O processing corresponding to the second data I/O request.

CITATION LIST

Patent Literature
PTL 1: Japanese Patent Application Laid-open Publication No. 2004-5370

SUMMARY OF INVENTION

Technical Problem

In the technique disclosed in PTL 1, the second storage controller also has a configuration to receive a data I/O request from the host computer, however, the first storage controller receives the data I/O requests sent from the host computer, including those for the second storage controller. Thus, when access from the host computer increases, access load is concentrated only on the first storage controller while the resources of the second storage controller are not effectively used.

The present invention has been made in view of such a problem and the like, and an object of the present invention is to provide a storage system and a method of controlling a storage system that enable the resources provided in the storage system to be effectively used.

Solution to Problem

One aspect of the present invention for solving the above-mentioned problem and other problems is a storage system comprising a first storage apparatus which performs data I/O for at least one first logical volume configured by using a storage area of a storage device in accordance with a first data I/O request sent from an external device, a second storage apparatus which performs data I/O for at least one second logical volume configured using a storage area of a storage device in accordance with the data I/O request sent from the external device, and a management apparatus which is an information processing apparatus communicatively coupled to each of the external device, the first storage apparatus, and the second storage apparatus, the storage system performing external attachment processing, in which the first storage apparatus stores associations between the first logical volume and the second logical volume in which an entity of data of the first logical volume is stored, upon receipt of the first data I/O request for the first logical volume from the external device, the first storage apparatus transmits a second data I/O request to the second storage apparatus, the second data I/O request being directed to the second logical volume associated with the first logical volume, upon receipt of the second data I/O request, the second storage apparatus performs data I/O for the second logical volume and transmits a response thereto to the first storage apparatus, and, upon receipt of the response, the first storage apparatus transmits a response to the first data I/O request to the external device, and the storage system performing external attachment release processing, in which the management apparatus transmits a instruction to the first storage apparatus to release the association between the first logical volume and the second logical volume, and transmits an instruction to the external device to change a path of the first data I/O request directed to the first logical volume so that the first data I/O request is directly transmitted to the second logical volume as a destination.

Further, the problems and their solutions disclosed in this application will become apparent through the sections of the embodiments and the drawings of the invention.

Advantageous Effects of Invention

According to the present invention, the resources provided in the storage system can be effectively used.

BRIEF DESCRIPTION OF DRAWINGS

FIG. 1 is a diagram showing the schematic configuration of a storage system 1 described as a first embodiment.
FIG. 2 is a diagram showing the hardware configuration of a host computer 3.
FIG. 3 is a diagram showing the main functions provided in the host computer 3, and the main data managed (stored) in the host computer 3.
FIG. 4 is an example of a path management table 321.
FIG. 5 is a diagram showing the hardware configuration of a storage apparatus 10.
FIG. 6 is a diagram showing the hardware configuration of FEPK11.
FIG. 7 is the hardware configuration of MPPK12.
FIG. 8 is the hardware configuration of BEPK13.
FIG. 9 is the hardware configuration of MainPK14.
FIG. 10 is a diagram showing the basic functions provided in the storage apparatus 10.
FIG. 11 is a flowchart illustrating write processing S1100.
FIG. 12 is a flowchart illustrating read processing S1200.
FIG. 13 is a diagram showing the main functions provided in a first storage apparatus 10, and the main data managed (stored) by the first storage apparatus 10.
FIG. 14 is an example of a RAID group management table 721.
FIG. 15 is an example of a logical device management table 722.
FIG. 16 is an example of an LU management table 723.
FIG. 17 is an example of a cache management table 724.
FIG. 18 is an example of a port management table 725.
FIG. 19 is a diagram showing the main functions provided in a second storage apparatus 10, and the main data managed (stored) by the second storage apparatus 10.

FIG. 20 is an example of a RAID group management table 761.

FIG. 21 is an example of a logical device management table 762.

FIG. 22 is an example of an LU management table 763.

FIG. 23 is an example of a cache management table 764.

FIG. 24 is an example of a port management table 765.

FIG. 25 is a diagram showing the hardware configuration of a management apparatus 30.

FIG. 26 is a diagram showing the main functions provided in the management apparatus 30, and the main data managed (stored) by the management apparatus 30.

FIG. 27 is an example of a port performance management table 421.

FIG. 28 is an example of a volume performance management table 422.

FIG. 29 is an example of a cache performance management table 423.

FIG. 30 is an example of a shift allowed/not allowed determination information management table 424.

FIG. 31 is an example of a path switching history management table 425.

FIG. 32 is a diagram showing the hardware configuration of a switch 4.

FIG. 33 is an example of a zoning setting table 3300.

FIG. 34 is a flowchart illustrating external attachment start processing S3400.

FIG. 35 is a flowchart illustrating performance monitoring processing S3500.

FIG. 36 is a flowchart illustrating the detail of path switching processing S3600.

FIG. 37 is a flowchart illustrating external attachment resume processing S3700.

FIG. 38 is a flowchart illustrating the detail of path switch back processing S3800.

FIG. 39 is a flowchart illustrating the detail (continued from FIG. 38) of the path switch back processing S3800.

FIG. 40 is a flowchart illustrating performance monitoring processing S4000 described as a second embodiment.

FIG. 41 is a flowchart illustrating the detail of path switching processing S4100 described as the second embodiment.

FIG. 42 is a flowchart illustrating the detail (continued from FIG. 41) of the path switching processing S4100.

FIG. 43 is a diagram showing the schematic configuration of the storage system 1 described as a third embodiment.

FIG. 44 is a flowchart illustrating performance monitoring processing S4400.

FIG. 45 is a flowchart illustrating the detail of path switching processing S4500.

FIG. 46 is an example of an LU access frequency management table 4600 described as a fourth embodiment.

FIG. 47 is an example of a tier management table 4700 described as the fourth embodiment.

DESCRIPTION OF EMBODIMENTS

In the following, the embodiments are described in detail with reference to the drawings.

First Embodiment

FIG. 1 shows a schematic configuration of the storage system 1 described as the first embodiment. As shown in the figure, the storage system 1 includes a host computer 3 (external apparatus), a first storage apparatus 10, a second storage apparatus 10, and a management apparatus 30. The host computer 3, the first storage apparatus 10, and the second storage apparatus 10 are communicatively coupled to each other via one or more network switches (hereinafter referred to as a switch 4). Also, the host computer 3, the switch 4, the first storage apparatus 10, the second storage apparatus 10, and the management apparatus 30 are all communicatively coupled to each other via a communication network 5. The storage system 1 is provided in, for example, a data center, an information management center of a company.

The communication network 5 is, for example, a LAN (Local Area Network), a WAN (Wide Area Network), a public line, a private line, and the like. Also, the switch 4 is, for example, a LAN switch or a Fibre Channel Switch of a Switching Hub and the like. The switch 4 is a component of a Storage Area Network which communicatively couples a storage apparatus group including the first storage apparatus 10 and the second storage apparatus 10.

Host Computer

The host computer 3 is an information processing apparatus (computer) which accesses the storage area provided by the storage apparatus 10 (the first storage apparatus 10 or the second storage apparatus 10), and is, for example, a personal computer, a workstation, a mainframe, and the like. The host computer 3 may function, for example, as a NAS (Network Attached Storage).

The host computer 3, for accessing the above-mentioned storage area provided by the storage apparatus 10, transmits a data frame (hereinafter abbreviated to frame) including a data I/O request (data write request, data read request, and the like) to the storage system 10. The above-mentioned frame transmitted to the storage apparatus 10 from the host computer 3 is, for example, a fiber channel frame (FC frame).

FIG. 2 shows an example of the hardware configuration of the host computer 3. As shown in the figure, the host computer 3 includes a central processing device 31, a memory 32, a storage device 33, an input device 34, an output device 35, a first communication interface (hereinafter referred to as a first communication I/F 36), and a second communication interface (hereinafter referred to as a second communication I/F 37). These components are communicatively coupled via a bus 30.

The central processing device 31 is, for example, a CPU (Central Processing Unit), an MPU (Micro Processing Unit), a custom LSI (Large Scale Integration), and the like. The memory 32 is, for example, a RAM (Random Access Memory), a ROM (Read Only Memory), an NVRAM (Non Volatile RAM), and the like. The storage device 33 is, for example, a hard disk, a semiconductor storage device (SSD (Solid State Drive)), and the like. The input device 34 is a keyboard, a mouse, a touch panel, and the like. The output device 35 is a liquid crystal monitor, a printer, and the like.

The first communication I/F 36 is configured using, for example, a NIC (Network Interface Card). The first communication I/F 36 includes one or more Communication Ports (hereinafter referred to as a first communication port 361) to communicate with other devices via the communication network 5. In the following description, it is assumed that the communication network 5 is a LAN, and the first communication I/F 36 is a NIC.

The second communication I/F 37 is configured using, for example, an HBA (Host Bus Adaptor), and includes one or more communication ports (hereinafter referred to as a second communication port 371) to communicate with other devices via the communication network 5. In the following description, it is assumed that the switch 4 is a fiber channel switch and the second communication I/F 37 is an HBA.

FIG. 3 is shows main functions provided in the host computer 3, and the main data managed (stored) in the host computer 3. As shown in the figure, the host computer 3 includes functions such as an operating system 311 (OS), a File System 312, a path management part 313, and an application 314. Also, as shown in FIG. 3, the host computer 3 manages (stores) the path management table 321. The above-mentioned functions are implemented by the central processing device 31 of the host computer 3 reading and executing programs stored in the memory 32 or the storage device 33 of the host computer 3.

The operating system 311 performs management of a process, scheduling of a process, management of storage area, handling of an interrupt request from hardware, and the like. The operating system 311 is implemented by executing, for example, a kernel module or a driver module.

The file system 312 implements access to the storage device 33 in units of files or directories. The file system 213 is, for example, a FAT (File Allocation Table), a NTFS, an HFS (Hierarchical File System), an ext3 (third extended file system), and an ext4 (fourth extended file system).

The path management part 313 manages information for defining each path in the path management table 321, the path along which a frame to be transmitted to the storage apparatus 10 is routed by an application 314 when a storage area (a later-described logical volume (LU)) of the storage apparatus 10 is accessed by the application 314. The path management part 313 updates the content of the path management table 321 as needed based on the information sent from the management apparatus 30 via the communication network 5.

FIG. 4 shows an example of the path management table 321. As shown in the figure, the path management table 321 includes multiple records including the items of a path ID 3211, a host port ID 3212, a WWN (host computer) 3213, a storage ID 3214 and a LUN 3215.

Among these, the path ID 3211 is set with an identifier (hereinafter referred to as a path ID) uniquely assigned to each path. The host port ID 3212 is set with an identifier of the second communication port 371 of the host computer 3 (hereinafter referred to as a host port ID). The WWN (host computer) 3213 is set with the WWN (World Wide Name) of a storage area network configured with the switch 4, which is assigned to each of the second communication port 371 of the host computer 3. The storage ID 3214 is set with an identifier (hereinafter referred to as a storage ID) uniquely assigned to each storage apparatus 10. The LUN 3215 is set with an identifier, a LUN (Logical Unit Number) which is uniquely assigned to each logical volume (LU) described later.

Referring back to FIG. 3, the application 314 is implemented by executing application programs installed in the host computer 3. The application 314 provides, for example, services such as an automatic deposit and payment system of a bank, a seat reservation system of an airplane, account settlement information system, and an invoice issuing system.

Storage Apparatus

FIG. 5 shows an example of the hardware configuration of the storage apparatus 10 (the first storage apparatus 10 or the second storage apparatus 10). As shown in the figure, the storage apparatus 10 includes multiple front-end packages (hereinafter referred to as FEPK 11), multiple processor packages (hereinafter referred to as MPPK 12), one or more back-end packages (hereinafter referred to as BEPK 13), multiple main packages (hereinafter referred to as MainPK 14), an internal switch 16 (or an internal bus), a storage device 17, and a maintenance device 18 (SVP: Service Processor).

As shown in FIG. 5, the FEPK 11, the MPPK 12, the BEPK 13, and the MainPK 14 are communicatively coupled to each other via the internal switch 16. Each of these packages (FEPK 11, the MPPK 12, the BEPK 13, and the MainPK 14) is configured with, for example, a circuit board (unit) which is removably insertable to the storage apparatus 10.

FEPK 11 receives a frame sent from the host computer 3, and transmits another frame which includes processing (for example, data read from the storage device 17, a read completion report, and a write completion report) in response to the data I/O request included in the received frame.

MPPK 12 performs high-speed data transfer between the FEPK 11, the BEPK 13, and the MainPK 14 according to the data I/O request included in the frame received from the host computer 3 by the FEPK 11. As specific examples of the above-mentioned data transfer, passing of the data read from the storage device 17 (hereinafter referred to as read data), passing of the data written to the storage device 17 (hereinafter referred to as write data), staging (reading of data from the storage device 17 to CM 145) and destaging (writing of data from CM 145 to the storage device 17) for CM 145 (described later) provided in the MainPK 14 are performed.

MainPK 14 includes a shared memory (hereinafter referred to as an SM 144), which stores the data (hereinafter referred to as control information) used for controlling processing related to a data I/O request, the data being shared between the FEPK 11, the MPPK 12, and the BEPK 13. Also, the MainPK 14 includes a cache memory (hereinafter referred to as a CM 145) which temporarily stores the data as the destination of a data I/O request.

BEPK 13, when reading data from the storage device 17, or writing data to the storage device 17, communicates with the storage device 17.

The internal switch 16 (or internal bus) is configured using, for example, a switching device such as a high-speed crossbar switch, or a hardware bus. Communication via the internal switch 16 is performed based on, for example, a protocol such as Fiber Channel, iSCSI, TCP/IP.

The storage device 17 is configured with multiple storage drives 171 which are physical recording media. The storage drive 171 is, for example, a hard disk drive (SAS (Serial Attached SCSI), SATA (Serial ATA), FC (Fibre Channel), PATA (Parallel ATA), a hard disk drive in accordance with a standard such as SCSI), a semi-conductor storage device (SSD). The storage device 17 may be housed in the same housing as the one, in which the apparatus 10 is housed, or may be housed in a housing other than the housing, in which the storage apparatus 10 is housed.

The storage apparatus 17 provides a storage area to the host computer 3 in units of logical devices (LDEV 172 (LDEV: Logical Device)) which are configured using RAID (Redundant Arrays of Inexpensive (or Independent) Disks) group (Parity Group) based on the storage area of the storage drive 171.

The storage apparatus 10 provides a logical storage area (hereinafter referred to as an LU (Logical Unit, Logical Volume)) configured using LDEV 172 to the host computer 3. The storage apparatus 10 manages the association (relationship) between LU and LDEV 172, and identifies LDEV 172 corresponding to LU, or identifies LU corresponding to LDEV 172 based on the above-mentioned association. Also, specific identifier (hereinafter referred to as a LUN (Logical Unit Number)) is assigned to each LU. The host computer 3 designates an LU as the access destination by setting the LUN to the frame to be transmitted to the storage apparatus 10.

FIG. 6 shows a hardware configuration of the FEPK 11. As shown in the figure, the FEPK 11 includes a processor 111 (a frame processing chip and a frame transfer chip are included), a memory 112, an internal communication interface (hereinafter referred to as an internal communication I/F 113), an external communication interface (hereinafter referred to as a first external communication I/F 114), and a second external communication interface (hereinafter referred to as a second external communication I/F 115). These components are communicatively coupled to each other via an internal bus 110.

The processor 111 is configured using, for example, a CPU, an MPU, and a custom LSI. The memory 112 is configured using, for example, a RAM, a ROM, and a NVRAM. The memory 112 stores therein microprograms, and various functions provided by the FEPK 11 are implemented by the processor 111 reading and executing the above-mentioned microprograms from the memory 112.

The internal communication I/F 113 communicates with the MPPK 12, the BEPK 13, and the MainPK 14 via the internal switch 16.

The first external communication I/F 114 communicates with the host computer 3 and the second storage apparatus 10 via the switch 4. The first external communication I/F 114 is configured using an interface such as an HBA (Host Bus Adaptor). The first external communication I/F 114 has multiple communication ports 1141 for communicating with the host computer 3 and the second storage apparatus 10. Specific identifier (hereinafter referred to as a storage port ID) is assigned to each communication port 1141.

The second external communication I/F 115 communicates with the management apparatus 30 via the communication network 5. The second external communication I/F 115 is configured using an interface such as a NIC (Network Interface Card). The second external communication I/F 115 has a communication port 1151 for communicating with the management apparatus 30.

FIG. 7 shows a hardware configuration of the MPPK 12. As shown in the figure, the MPPK 12 includes a processor 121, a memory 122, an internal communication interface (hereinafter referred to as an internal communication I/F 123), and a DMA 124 (data transfer device). These components are communicatively coupled to each other via an internal bus 120.

The processor 121 is configured using, for example, a CPU, an MPU, and a custom LSI. The memory 122 is configured using, for example, a RAM, a ROM, and a NVRAM. The memory 122 stores therein microprograms. Various functions provided by the MPPK 12 are implemented by the processor 121 reading and executing the above-mentioned microprograms from the memory 122.

The internal communication I/F 123 communicates with the FEPK 11, the BEPK 13, and the MainPK 14 via the internal switch 16. DMA 124 (Direct Memory Access) transfers data between the FEPK 11, the BEPK 13, and the MainPK 14 according to a transfer parameter set (specified) in the memory 122 by the processor 121.

FIG. 8 shows a hardware configuration of the BEPK 13. As shown in the figure, the BEPK 13 includes a processor 131, a memory 132, an internal communication interface (hereinafter referred to as an internal communication I/F 133), and a drive interface (hereinafter referred to as a drive I/F 134). These components are communicatively coupled to each other via an internal bus 130.

The processor 131 is configured using, for example, a CPU, an MPU, and a custom LSI. The memory 132 is configured using, for example, a RAM, a ROM, and a NVRAM. The memory 132 stores therein microprograms. Various functions provided by the BEPK 13 are implemented by the processor 131 reading and executing the above-mentioned microprograms from the memory 132.

The internal communication I/F 133 communicates with the FEPK substrate 11, the MPPK 12, and the MainPK 14 via the internal switch 16. The drive I/F 134 performs communication with the storage apparatus 17.

FIG. 9 shows a hardware configuration of the MainPK 14. As shown in the figure, the MainPK 14 includes a processor 141, a memory 142, an internal communication interface (hereinafter referred to as an internal communication I/F 143), a shared memory (SM 144), and a cache memory (CM 145). These components are communicatively coupled to each other via an internal bus 140.

The processor 141 is configured using, for example, a CPU, an MPU, and a custom LSI. The memory 142 is configured using, for example, a RAM, a ROM, and a NVRAM. The memory 142 stores therein microprograms. Various functions provided by the MainPK 14 are implemented by the processor 141 reading the above-mentioned microprograms from the memory 142 and executing the same.

The internal communication I/F 143 communicates with the FEPK 11, the MPPK 12, and the BEPK 13 via the internal switch 16. SM 144 is configured using, for example, a CPU, an MPU, and a NVRAM. SM 144 stores various information (for example, the configuration information of the storage apparatus 10, information for redundant management of data, information for ensuring security and maintainability of data, and information for the maintenance of the storage apparatus 10) which are referred to or updated when the storage apparatus 10 performs data output/input operation regarding the storage device 17.

SM 145 is configured using, for example, a RAM, and a NVRAM. CM 145 temporarily stores the above-mentioned cache data (data written to the storage device 17 (hereinafter referred to as write data), and data read from the storage device 17 (hereinafter referred to as read data)).

Referring back to FIG. 5, the maintenance device 18 shown in the figure is configured using, for example, a personal computer and an office computer. The maintenance device 18 is communicatively coupled to the management apparatus 30 via the communication network 5.

The maintenance device 18 communicates with the FEPK 11, the MPPK 12, the BEPK 13, and the MainPK 14 via the internal switch 16. Also, the maintenance device 18 communicates with the management apparatus 30 via the communication network 5, and provides, for example, the configuration information, the operation information, and the like of the storage apparatus 10 to the management apparatus 30. Also, the maintenance device 18 performs processing related to configuration of the information stored in SM 144, control of the storage apparatus 10, maintenance of the storage apparatus 10 (including introduction and update of software), and the like based on the information sent from the management apparatus 30.

Basic Functions of Storage Apparatus

FIG. 10 shows the basic functions provided in the storage apparatus 10 (the first storage apparatus 10 or the second storage apparatus 10). As shown in the figure, the storage apparatus 10 includes an I/O processing part 700 which contains a data write processing part 701 for performing processing related to writing data to the storage device 17, and a data read processing part 702 for performing processing related to reading data from the storage device 17.

The I/O processing part 700 is implemented by the hardware provided in the FEPK 11, the MPPK 12, the BEPK 13, and the MainPK 14 of the storage apparatus 10, or by the processors 111, 121, 131, 141 reading and executing the microprograms stored in the memories 112, 122, 132, 142.

FIG. 11 is a diagram illustrating the functions of the data write processing part 701 of the I/O processing part 700, and is a flowchart illustrating the processing to be performed (hereinafter referred to as write processing S1100) when the storage apparatus 10 receives a frame including a data write request from the host computer 3. In the following, the write processing S1100 is described with the figure. Note that, in the description below, the letter "S" prefixed to each reference numeral indicates "step" p.

As shown in FIG. 11, first, the FEPK 11 of the storage apparatus 10 receives a frame including a data write request sent from the host computer 3 (S1111, S1112), and notifies this event to the MPPK 12 (S1113).

MPPK 12, when receiving the above-mentioned notification from the FEPK 111 (S1121), generates a drive write request based on the data write request in the frame, and stores the write data in the cache memory (CM 145) of the MainPK 14, while responding with an acknowledgement of reception of the above-mentioned notification to the FEPK11 (S1122). Also the MPPK 12 transmits the generated drive write request to the BEPK 13 (S1123).

FEPK 11, when receiving the above-mentioned response from the MPPK 12, transmits a completion report to the host computer 3 (S1114). The host computer 3 receives the completion report from the FEPK 11 (S1115).

BEPK 13, when receiving the drive write request from the MPPK 12, registers the drive write request with the write processing queue (S1124).

BEPK 13 reads the drive write request from the write processing queue as needed (S1125). the BEPK 13 reads the write data designated in the read drive write request from the cache memory of the MainPK 14 (CM 145), and writes the read write data to the storage device (the storage drive 171) (S1126). Also, the BEPK 13 notifies to the MPPK 12 a report (completion report) notifying that writing of the write data is completed according to the drive write request (S1127).

MPPK 12 receives the completion report sent from the BEPK 13 (S1128).

FIG. 12 is a diagram illustrating the functions of the data read processing part 702 of the I/O processing part 700, and is a flowchart illustrating the processing to be performed (hereinafter referred to as read processing S1200) when the storage apparatus 10 receives a frame including a data read request from the host computer 3. In the following, the read processing S1200 is described with the figure.

As shown in FIG. 12, first, the FEPK 11 of the storage apparatus 10 receives a frame from the host computer 3 (S1211, S1212).

FEPK 11, when receiving the above-mentioned frame, notifies this event to the BEPK 13 (S1213).

BEPK 13, when receiving the above-mentioned notification from the FEPK 11

(S1214), reads the data designated (for example, by LBA (Logical Block Address)) in the data read request included in the frame from the storage device 17 (S1215). In the case where read data exists in the cache memory (CM 145) of the MainPK 14 (in the case where read data is staged), read processing from the storage apparatus 17 (S1215) is omitted.

MPPK 12 writes the data read by the BEPK 13 to the cache memory (CM 145) (S1216). the MPPK 12 then transfers the data currently written in the cache memory (CM 145) to the FEPK 11 as needed (S1217).

FEPK 11 receives the read data sent from the MPPK 12, and transmits the received read data to the host computer 3 (S1218). the FEPK11, when completing the transmission of the read data to the host computer 3, transmits a completion report to the host computer 3 (S1219). The host computer 3 receives the read data and the completion report (S1220, S1221).

Functions of First Storage Apparatus

FIG. 13 shows the main functions provided in the first storage apparatus 10, and the main data managed (stored) by the first storage apparatus 10. As shown in the figure, in addition to the above-described I/O processing part 700, the first storage apparatus 10 includes a storage performance acquisition part 711, an external attachment mapping processing part 712, and a cache controller 713. These functions are implemented by the hardware provided in the FEPK 11, the MPPK 12, the BEPK 13, and the MainPK 14 of the first storage apparatus 10, or by the processors 111, 121, 131, 141 reading and executing the microprograms stored in the memories 112, 122, 132, 142.

The storage performance acquisition part 711 in the above-mentioned functions performs processing related to acquisition of information about the performance of the first storage apparatus 10.

The external attachment mapping processing part 712 performs processing related to the logical volume (LU) externally coupled. The external attachment means an operation mode of the storage system 1, by which the entity of the logical volume provided by the first storage apparatus 10 to the host computer 3 is located in the second storage apparatus 10.

The external attachment mapping processing part 712, when receiving a data I/O request to the logical volume (LU) externally coupled, from the host computer 3, transfers the data I/O request to the second storage apparatus 10 in which the entity of the logical volume (LU) is located. The second storage apparatus 10, when receiving the above-mentioned data I/O request, inputs/outputs data to and from the entity of the logical volume (LU), and returns the processing result (data and processing status read from the entity) to the first storage apparatus 10. The first storage apparatus 10, when receiving the above-mentioned processing result, returns a response to the data I/O request received from the host computer 3 to the host computer 3. In this manner, the data I/O request from the host computer 3 to externally coupled logical volume (LU) is transmitted to the first storage apparatus 10, and a response of the processing result to the host computer 3 is also made by the first storage apparatus 10.

The operation mode by the external attachment is applied for the purpose of apparently increasing the storage area of the first storage apparatus 10 for the host computer 3 by using, for example, a storage area of the second storage apparatus 10 (logical volume (LU) provided by the second storage apparatus 10). Also, the operation mode by the external attachment is applied for the purpose of providing the services that can be provided only by the first storage apparatus 10 (for example, those services that can be provided only by the first storage apparatus 10 which has higher performance than the second storage apparatus 10) to the host computer 3, while effectively utilizing the storage area of the second storage apparatus 10 that cannot provide the above-mentioned services (due to reasons, for example, the second storage apparatus 10 is compliant with a specification older than that of the storage apparatus 10, or the second storage apparatus 10 is manufactured by a vendor different from the vendor of the first storage apparatus 10).

The cache controller 713 shown in FIG. 13 performs processing related to the control of the cache memory (CM 145 of MainPK 14) of the first storage apparatus 10.

As shown in the figure, the first storage apparatus 10 manages (stores) a RAID group management table 721, a logical device management table 722, a LU management table 723, a cache management table 724, and a port management table 725. The management apparatus 30 can acquire the content of these tables managed (stored) by the first storage apparatus 10 as needed via the communication network 5.

FIG. 14 shows an example of the RAID group management table 721. The RAID group management table 721 manages information on RAID group, which is configured using the storage drive 171 of the first storage apparatus 10. As shown in FIG. 14, the RAID group management table 721 includes one or more records including the items of a RAID group ID 7211, a storage drive ID 7212, and a RAID level 7213.

Among these, the RAID group ID 7211 is set with an identifier (hereinafter referred to as a RAID group ID) uniquely assigned to each RAID group which is configured using the storage drive 171 of the first storage apparatus 10. The storage drive ID 7212 is set with an identifier (hereinafter referred to as a storage drive ID) uniquely assigned to each storage drive 171 of the first storage apparatus 10. The RAID level 7213 is set with information (hereinafter referred to as RAID configuration information) indicating the type and configuration of the RAID group identified by the RAID group ID 7211.

FIG. 15 shows an example of the logical device management table 722. The logical device management table 722 manages information on a logical device (LDEV) of the first storage apparatus 10. As shown in FIG. 15, the logical device management table 722 includes one or more records including the items of a logical device ID 7221, a RAID group ID 7222, a start address 7223, an ending address 7224, and a cache mode 7225.

Among these, the logical device ID 7221 is set with an identifier (hereinafter referred to as a logical device ID) uniquely assigned to each logical device of the first storage apparatus 10. The RAID group ID 7222 is set with a RAID group ID described above. The start address 7223 is set with the start address of the storage area of RAID group, which is assigned to the logical device. The ending address 7224 is set with the ending address of the storage area of RAID group, which is assigned to the logical device.

The cache mode 7225 is set with information indicating whether or not the cache memory (CM 145 of MainPK 14) of the first storage apparatus 10 is used when data I/O is performed regarding the logical device. In the case where "ON" is set to the cache mode 7225, the first storage apparatus 10 uses the cache memory (CM 145) of itself (the first storage apparatus 10) when data I/O is performed to the logical device, while in the case where "OFF" is set to the cache mode 7225, the first storage apparatus 10 does not use the cache memory (CM 145) of itself (the first storage apparatus 10) when data I/O is performed regarding the logical device.

FIG. 16 shows an example of the LU management table 723. The LU management table 723 manages information on the logical volume (LU) (including a virtual logical volume (LU) whose entity (physical storage area) does not exist in the first storage apparatus 10, but exists in the second storage apparatus 10) which is provided by the first storage apparatus 10 to the host computer 3. As shown in FIG. 16, the LU management table 723 includes one or more records including the items of a LUN 7231, a logical device ID 7232, a capacity 7233, specific information 7234, and a mapping storage information 7235.

Among these, the LUN 7231 is set with the LUN of a logical volume of the first storage apparatus 10. The logical device ID 7232 is set with the logical device ID of a logical device of the first storage apparatus 10. The capacity 7233 is set with the storage capacity of the relevant logical volume (the logical volume identified by the LUN 7231).

The specific information 7234 is set with lamination (hereinafter referred to as specific information) uniquely set to each logical volume. The specific information is the information acquired by Inquiry command when the relevant logical volume is set as a destination device, for example, in SCSI (Small Computer System Interface) standard, and is needed for accessing to the logical volume from the host computer 3.

The mapping storage information 7235 is set with the storage ID of the second storage apparatus 10 in which the entity is located, and the LUN of the logical volume in which the entity is located when the logical volume (LU) is externally coupled. When the logical volume (LU) is not externally coupled, the mapping storage information 7235 is set with an ineffective value (space, NULL, and the like).

FIG. 17 shows an example of the cache management table 724. The cache management table 724 manages information on status of use of the cache memory (CM 145) of the first storage apparatus 10. As shown in the figure, the cache management table 724 includes one or more records including the items of a cache address 7241, a logical device ID 7242, and a block address 7243.

Among these, the cache address 7241 is set with the address of a cache memory (CM 145) of the first storage apparatus 10. The logical device ID 7242 is set with the logical device ID of the logical device of the first storage apparatus 10, which currently uses the address. The block address 7243 is set with the block address of the logical device of the first storage apparatus 10, which currently uses the address.

FIG. 18 shows an example of the port management table 725. The port management table 725 manages the WWNs of the storage area network which is assigned to each communication port 1141 of the first external communication I/F 114 of the FEPK 11 of the first storage apparatus 10. As shown in FIG. 18, the port management table 725 includes one or more records including the items of a storage port ID 7251 and a WWN 7252.

Among these, the storage port ID 7251 is set with the storage port ID of a communication port 1141 of the first storage apparatus 10. The WWN 7252 is set with the WWN assigned to the storage port ID in the storage area network.

Functions of Second Storage Apparatus

FIG. 19 shows the main functions provided in the second storage apparatus 10, and the main data managed (stored) by the second storage apparatus 10. As shown in the figure, in addition to the above-described I/O processing part 700, the second storage apparatus 10 includes a storage performance acquisition part 751 and a cache controller 753. These functions are implemented by the hardware provided in the FEPK 11, the MPPK 12, the BEPK 13, and the MainPK 14 of the second storage apparatus 10, or by the processors 111, 121, 131, 141 reading and executing the microprograms stored in the memories 112, 122, 132, 142.

The storage performance acquisition part 751 in the above-mentioned functions performs processing related to acquisition of information about the performance of the second storage apparatus 10.

The cache controller 753 performs processing related to the control of the cache memory (CM 145 of MainPK 14) of the second storage apparatus 10.

As shown in FIG. 19, the second storage apparatus 10 manages (stores) a RAID group management table 761, a logical device management table 762, a LU management table 763, a cache management table 764, and a port management table 765. The management apparatus 30 can acquire the content of these tables managed (stored) by the second storage apparatus 10 as needed via the communication network 5.

FIG. 20 shows an example of the RAID group management table 761. The RAID group management table 761 manages information on RAID group, which is configured using the storage drive 171 of the second storage apparatus 10. As shown in FIG. 20, the RAID group management table 761 includes one or more records including the items of a RAID group ID 7611, a storage drive ID 7612, and a RAID level 7613.

Among these, the RAID group ID 7611 is set with the RAID group ID of the RAID group which is configured using the storage drive 171 of the second storage apparatus 10. The storage drive ID 7612 is set with the storage drive ID of the storage drive 171 of the second storage apparatus 10. The RAID level 7613 is set with the RAID configuration information of the RAID group ID 7611 of the second storage apparatus 10.

FIG. 21 shows an example of the logical device management table 762. The logical device management table 762 manages information on a logical device (LDEV) of the second storage apparatus 10. As shown in FIG. 21, the logical device management table 762 includes one or more records including the items of a logical device ID 7621, a RAID group ID 7622, a start address 7623, an ending address 7624, and a cache mode 7625.

Among these, the logical device ID 7621 is set with the logical device ID of a logical device of the second storage apparatus 10. The RAID group ID 7622 is set with a RAID group ID. The start address 7623 is set with the start address of the storage area of RAID group, which is assigned to the logical device. The ending address 7624 is set with the ending address of the storage area of the RAID group, which is assigned to the logical device.

The cache mode 7625 is set with information indicating whether or not the cache memory (CM 145 of MainPK 14) of the second storage apparatus 10 is used when data I/O is performed regarding the logical device. In the case where "ON" is set to the cache mode 7625, the second storage apparatus 10 uses the cache memory (CM 145) of itself (the second storage apparatus 10) when data I/O is performed regarding the logical device, while in the case where "OFF" is set to the cache mode 7625, the second storage apparatus 10 does not use the cache memory (CM 145) of itself (the second storage apparatus 10) when data I/O is performed regarding the logical device.

FIG. 22 shows an example of the LU management table 763. The LU management table 763 manages information on the logical volume (LU) which is provided by the second storage apparatus 10 to the host computer 3. As shown in FIG. 22, the LU management table 763 includes one or more records including the items of a LUN 7631, a logical device ID 7632, a capacity 7633, and specific information 7634.

Among these, the LUN 7631 is set with the LUN of a logical volume of the second storage apparatus 10. The logical device ID 7632 is set with the logical device ID of a logical device of the second storage apparatus 10. The capacity 7633 is set with the storage capacity of the relevant logical volume (the logical volume identified by the LUN 7631). The specific information 7634 is set with the specific information of the relevant logical volume.

FIG. 23 shows an example of the cache management table 764. The cache management table 764 manages information on status of use of the cache memory (CM 145) of the second storage apparatus 10. As shown in FIG. 23, the cache management table 764 includes one or more records including the items of a cache address 7641, a logical device ID 7642, and a block address 7643.

Among these, the cache address 7641 is set with the address of a cache memory (CM 145) of the second storage apparatus 10. The logical device ID 7642 is set with the logical device ID of the logical device of the second storage apparatus 10, which currently uses the address. The block address 7643 is set with the block address of the logical device of the second storage apparatus 10, which currently uses the address.

FIG. 24 shows an example of the port management table 765. The port management table 765 manages the WWNs of the storage area network which is assigned to each communication port 1141 of the first external communication I/F 114 of the FEPK 11 of the second storage apparatus 10. As shown in FIG. 24, the port management table 765 includes one or more records including the items of a storage port ID 7651 and a WWN 7652.

Among these, the storage port ID 7651 is set with the storage port ID of a communication port 1141 of the second storage apparatus 10. The WWN 7652 is set with the WWN assigned to the storage port ID in the storage area network.

Management Apparatus

The management apparatus 30 is a computer communicatively coupled to the host computer 3, the switch 4, the maintenance device 18 of the storage apparatus 10 (the first storage apparatus 10 and the second storage apparatus 10). The management apparatus 30 includes a user interface configured using GUI (Graphical User Interface). CLI (Command Line Interface), and the like for making respective configuration, control, monitoring of the host computer 3, the switch 4, and the storage apparatus 10.

FIG. 25 shows an example of the hardware configuration of the management apparatus 30. As shown in the figure, the management apparatus 30 includes a central processing device 41, a memory 42, a storage device 43, an input device 44, an output device 45, and a communication interface (hereinafter referred to as a communication I/F 46). These components are communicatively coupled via a bus 40.

The central processing device 41 is, for example, a CPU, an MPU, a custom LSI, and the like. The memory 42 is, for example, a RAM, a ROM, an NVRAM, and the like. The storage device 43 is, for example, a hard disk, a semiconductor storage device (SSD), and the like. The input device 44 is a keyboard, a mouse, a touch panel, and the like. The output device 45 is a liquid crystal monitor, a printer, and the like. The communication I/F 46 is configured using, for example, a NIC. The communication I/F 46 includes one or more communication ports 461 to communicate with the host computer 3, the switch 4, the first storage apparatus 10, and the second storage apparatus 10 via the communication network 5.

Functions of Management Apparatus

FIG. 26 shows the main functions provided in the management apparatus 30, and the main data managed (stored) by the management apparatus 30. As shown in the figure, the management apparatus 30 includes the functions of an external attachment setting processing part 411, a path switching processing part 412, and a path switch back processing part 413. The above-mentioned functions are implemented by the central processing device 41 reading the programs stored in the memory 42 and executing the same, and the storage device 43 of the management apparatus 30.

The external attachment setting processing part 411 makes configuration and control related to external attachment for the first storage apparatus 10 and the second storage apparatus 10.

The path switching processing part 412 releases externally coupled logical volume (LU), and performs processing related to path configuration to change to the operation mode (hereinafter referred to as an operation mode by direct access method) by which the host computer 3 accesses directly to the above-mentioned externally coupled logical volume (LU) via a storage area network, not via the first storage apparatus 10.

The path switch back processing part 413 performs processing related to resumption of external attachment and configuration of path for resuming external attachment for the logical volume (LU) which is configured to be directly coupled to the host computer 3 via a storage area network by the path switching processing part 412.

As shown in FIG. 26, the management apparatus 30 manages (stores) a port performance management table 421, a volume performance management table 422, a cache performance management table 423, a shift allowed/not allowed determination information management table 424, and a path switching history management table 425. Among these, the port performance management table 421, the volume performance management table 422, and the cache performance management table 423 manages (stores) information on the performance of the storage apparatus 10 (hereinafter referred to as performance information).

FIG. 27 shows an example of the port performance management table 421. The port performance management table 421 manages information on the performance (e.g., status of use) of the communication port 1141 of the storage apparatus 10 (the first storage apparatus 10 and the second storage apparatus 10). As shown in FIG. 27, the port perfoimance management table 421 includes one or more records including the items of a storage ID 4211, a port ID 4212, a maximum IOPS 4213, and an IOPS measured value 4214.

Among these, the storage ID 4211 is set with the storage ID of the storage apparatus 10 (the first storage apparatus 10 or the second storage apparatus 10). The port ID 4212 is set with the port ID of the communication port 1141 of the storage apparatus 10. The maximum IOPS 4213 is set with the number of times of I/O processing per unit time (hereinafter referred to as a maximum IOPS (Input Output Per Second)), which can be achieved by the communication port 1141. The IOPS measured value 4214 is set with an actual measured value of IOPS of the communication port 1141 of the storage apparatus 10. The actual measured value of IOPS is acquired as needed by the management apparatus 30 communicating with the storage apparatus 10 (the first storage apparatus 10 or the second storage apparatus 10).

FIG. 28 shows an example of the volume performance management table 422. The volume performance management table 422 manages information on the performance (status of use) of the logical volume (LU) of the storage apparatus 10 (the first storage apparatus 10 and the second storage apparatus 10). As shown in FIG. 28, the volume performance management table 422 includes one or more records including the items of a storage ID 4221, a LUN 4222, an IOPS measured value 4223, and an IOPS threshold value 4224.

Among these, the storage ID 4211 is set with the storage ID of the storage apparatus 10 (the first storage apparatus 10 or the second storage apparatus 10). The LUN 4222 is set with the LUN of the logical volume (LU) of the storage apparatus 10. The IOPS measured value 4223 is set with an actual measured value of IOPS of the logical volume (LU). The actual measured value of FOPS is acquired as needed by the management apparatus 30 communicating with the storage apparatus 10 (the first storage apparatus 10 or the second storage apparatus 10). The IOPS threshold value 4224 is set with a threshold value (hereinafter referred to as an IOPS threshold value) for determining the load of the logical volume (LU).

FIG. 29 shows an example of the cache performance management table 423. The cache performance management table 423 manages information on the performance (status of use) of the cache memory (CM 145) of the MainPK 14 of the storage apparatus 10 (the first storage apparatus 10 and the second storage apparatus 10). As shown in FIG. 29, the cache performance management table 423 includes one or more records including the items of a storage ID 4231, a cache utilization ratio 4232, and a cache utilization ratio threshold value 4234.

Among these, the storage ID 4231 is set with the storage ID of the storage apparatus 10 (the first storage apparatus 10 or the second storage apparatus 10). The cache utilization ratio 4232 is set with an actual measured value of utilization ratio (used capacity/the total capacity of the cache memory (CM 145)) of the cache memory. The actual measured value of the cache memory is acquired as needed by the management apparatus 30 communicating with the storage apparatus 10 (the first storage apparatus 10 or the second storage apparatus 10). The cache utilization ratio threshold value 4234 is set with a threshold value (hereinafter referred to as a cache utilization ratio threshold value) for determining the load of the storage apparatus 10.

FIG. 30 shows an example of the shift allowed/not allowed determination information management table 424. The shift allowed/not allowed determination information management table 424 manages information used for the determination whether or not shift to the operation mode with direct access is allowed by the path switching processing part 412 for each logical volume (LU) of the storage apparatus 10 (the first storage apparatus 10 or the second storage apparatus 10).

The content of the shift allowed/not allowed determination information management table 424 is set manually (for example, an operator of the management apparatus 30 sets the content manually). Also, the content of the shift allowed/not allowed determination information management table 424 is automatically set by the management apparatus 30 based on e.g., the configuration information of the host computer 3 or the storage apparatus 10.

As shown in FIG. 30, the shift allowed/not allowed determination information management table 424 includes one or more records including the items of a storage ID 4241, a LUN 4242, an I/O stop allowed/not allowed 4243, a path switching allowed/not allowed 4244, storage functions stop allowed/not allowed 4245, and a backup operation change allowed/not allowed 4246.

Among these, the storage ID 4241 is set with the storage ID of the storage apparatus 10. The LUN 4242 is set with the LUN of a logical volume (LU) of the storage apparatus 10.

The I/O stop allowed/not allowed 4243 is set with information indicating whether or not stopping data I/O for the logical volume (LU) may cause a problem (allowed/not allowed) when the operation mode is shifted to the direct access mode.

The path switching allowed/not allowed 4244 is set with information indicating whether or not switching the path accessing to the logical volume (LU) from the host computer 3 may cause a problem (allowed/not allowed) when the operation mode is shifted to the direct access mode.

The storage functions stop allowed/not allowed 4245 is set with information indicating whether or not stopping the functions with which the logical volume (LU) is involved (functions mounted on the storage apparatus 10) may cause a problem (allowed/not allowed) when the operation mode is shifted to the direct access mode.

The above-mentioned functions includes, for example, a function related to Thin Provisioning, duplication control function (local copy), remote duplication function (remote copy), and the like. Among these, Thin Provisioning function enables allocation to the host computer 3 of storage capacity exceeding the physical storage capacity mounted on the storage apparatus 10 (the storage capacity that can be provided to the host computer 3 by the storage drive 171), and is a function of increasing the physical storage capacity according to actually used capacity. Thin Provisioning function is introduced to the storage apparatus 10 for the purpose of, for example, effectively using the physical storage area, or reducing system introduction/operation cost.

Also, the duplication control function (local copy) is a function of storing a duplication of the data stored in a logical volume (LU) into another logical volume (LU) belonging to the same storage apparatus 10. Also, the remote duplication function (remote copy) is a function of storing a duplication of the data stored in a logical volume (LU) of the storage apparatus 10 (primary apparatus) into a logical volume (LU) of the other storage apparatus 10 different from the relevant storage apparatus 10. The duplication control function (local copy) and the remote duplication function (remote copy) are introduced to the storage apparatus 10 for the purpose of, for example, ensuring security and maintainability of data.

Referring back to FIG. 30, the backup operation change allowed/not allowed 4246 is set with information indicating whether or not stopping the backup function for the logical volume (LU) (for example, storing function to a magnetic tape) may cause a problem (allowed/not allowed) at the time of the above-mentioned shift.

FIG. 31 shows an example of the path switching history management table 425. The path switching history management table 425 manages history of path switching performed when the operation mode is shifted to the direct access mode. As shown in FIG. 31, the path switching history management table 425 includes one or more records including the items of a switching source storage ID 4251, a switching source LUN 4252, a switching destination storage ID 4253, a switching destination LUN 4254, and a switched data/time 4255.

Among these, the switching source storage ID 4251 is set with the storage ID of the storage apparatus 10 which is the switching source of the path switching performed when the operation mode is shifted to the direct access mode. Also, the switching source LUN 4252 is set with the LUN of the logical volume (LU) which is the switching source. Also, the switching destination storage ID 4253 is set with the storage ID of the storage apparatus 10 which is the switching destination. Also, the switching destination LUN 4254 is set with the LUN of the logical volume (LU) which is the switching destination. The switching date/time 4255 is set with the date and time when the above-mentioned switching is performed.

Switch

FIG. 32 shows an example of the hardware configuration of the switch 4 (network switch). As shown in the figure, the switch 4 includes a plurality of communication ports 81 for transmitting and receiving data, a plurality of I/F control circuits 82, a switching circuit 83, a processor 84, and a memory 85.

The communication port 81 includes a Transceiver which has a transmission circuit (Tx) and a reception circuit (Rx) for an electric signal or a light signal. The I/F control circuit 82 performs data communication between the communication port 81 and the switching circuit 83, control of the communication port 81, and error control of data. The switching circuit 83 makes path selection between the communication ports 81.

The processor 84 is configured using a CPU, an MPU, a custom LSI, and the like.

The processor 84, implements the protocol processing function, the routing function, the zoning function, and the fault management function provided in the switch 4 by executing programs stored (saved) in the memory 85. The memory 85 is a RAM, a ROM, a NVRAM, and the like. In addition to the above-mentioned programs, the memory 85 stores a routing table (corresponding relationship of communication port 81), and a later-described zoning setting table 3300, and the like.

The communication interface (hereinafter denoted as a communication I/F 86) communicates with the management apparatus 30 via the communication network 5. Various operational settings of the switch 4 such as routing setting or zoning setting of the switch 4, settings and information collection related to fault management can be made from the management apparatus 30 via the communication network 5.

FIG. 33 shows an example of a zoning setting table 3300 stored in the memory 85. As shown in the figure, the zoning setting table 3300 includes one or more records including the items of a zone ID 3311 and a WWN 3312.

The zone ID 3311 is set with an identifier (hereinafter referred to as a zone ID) assigned to each accessible range (hereinafter referred to as a zone) from the host computer 3 to the storage apparatus 10. The WWN 3312 is set with the WWN assigned to the host computer 3 belonging to the zone, or the WWN assigned to the storage apparatus 10 belonging to the zone.

=Description of Processing=

Start of External Attachment

FIG. 34 is a flowchart illustrating the processing (hereinafter referred to as an external attachment start processing S3400) performed in the storage system 1 when an operation by external attachment is started. The external attachment start processing S3400 is performed according to, for example, an operation which is received from an operator by the management apparatus 30. In the following, the external attachment start processing S3400 is described with reference to FIG. 34.

When an operation by external attachment (external attachment processing) is started, first, the management apparatus 30 transmits an instruction to the second storage apparatus 10, the instruction for creating the logical volume (LU) (hereinafter referred to as an entity storage LU) in which the entity of the first storage apparatus 10 is stored for the external attachment (S3411).

The second storage apparatus 10, when receiving the above-mentioned creation instruction, creates an entity storage LU, and registers the information of the created entity storage LU to the LU management table 763 of the second storage apparatus 10 (S3412).

Next, the management apparatus 30 transmits the LUN of the entity storage LU created by the second storage apparatus 10, and an acquisition request for specific information to the second storage apparatus 10 (S3413). The acquisition request for specific information is made by transmitting an Inquiry command in SCSI standard from the management apparatus 30 to the second storage apparatus 10.

In response to the above-mentioned request, the second storage apparatus 10 transmits the LUN and specific information to the management apparatus 30 (S3414), then the management apparatus 30 receives the transmitted LUN and specific information (S3415).

Next, the management apparatus 30 transmits an instruction for the first storage apparatus 10 to make needed setting for external attachment, along with the storage ID of the second storage apparatus 10 in which the entity storage LU exists, the LUN of the entity storage LU, and the received specific information (S3416).

The first storage apparatus 10, when receiving the above-mentioned instruction, registers the storage ID, the LUN of the entity storage LU, and the specific information, which are transmitted from the management apparatus 30, to the LU management table 723 of the first storage apparatus 10 (S3417). Specifically, the received specific information is set to the specific information 7234 of the record of the logical volume (LU) which is to be externally coupled, and the storage ID and the LUN of the entity storage LU that have been sent from the management apparatus 30 are registered to the mapping storage information 7235.

In the above manner, the setup for starting the operation by external attachment is completed, and according to e.g., an instruction from the management apparatus 30, the operation by external attachment using the above-mentioned entity storage LU is started by the first storage apparatus 10 and the second storage apparatus 10 (S3418).

Release of External Attachment

While the operation by external attachment is performed in the first storage apparatus 10 and the second storage apparatus 10, the management apparatus 30 monitors the performance of the first storage apparatus 10 as needed. The management apparatus 30, when detecting a problem in the performance of the first storage apparatus 10, determines whether or not the external attachment can be stopped. In the case where the external attachment can be stopped, the external attachment is stopped (released), and the current operation is switched to the direct access operation (the operation in which the host computer 3 directly transmits a data I/O request for the destination entity storage LU of the second storage apparatus 10 not via the first storage apparatus 10 (hereinafter referred to as an operation by the direct access method)) in which the host computer 3 accesses directly the entity storage LU of the second storage apparatus 10 via the storage area network.

FIG. 35 is a flowchart illustrating the processing performed mainly by the management apparatus 30 (hereinafter referred to as performance monitoring processing S3500) when the performance of the above-mentioned first storage apparatus 10 is monitored. In the following, the flowchart is described with reference to FIG. 35.

The management apparatus 30 acquires the performance information of the first storage apparatus 10 actively or passively as needed from the first storage apparatus 10 (S3511). The performance information acquired by the management apparatus 30 is managed (stored) in the port performance management table 421, the volume performance management table 422, and the cache performance management table 423.

The management apparatus 30 determines as needed whether or not there is any problem in the performance of the first storage apparatus 10 based on the acquired performance information (S3512), and in the case there is a problem in the performance (S3512: YES), the management apparatus 30 starts the processing subsequent to S3513.

Whether there is a problem in the performance is determined by checking, for example, based on the port performance management table 421, whether or not there exists a communication port 1141 for which the IOPS measured value 4214 exceeds the maximum IOPS 4213. Alternatively, based on the volume performance management table 422 for example, the determination is made by checking whether or not there exists a logical volume (LU) for which the IOPS measured value 4223 exceeds the IOPS threshold value 4224. Alternatively, based on the cache performance management table 423 for example, the determination is made by checking whether or not the cache utilization ratio 4232 exceeds the cache utilization ratio threshold value 4233.

In S3513, the management apparatus 30 determines whether or not there exists a logical volume (LU) which is operated by external attachment (hereinafter referred to as an external attachment LU) in the first storage apparatus 10, and the operation can be switched to the operation by the direct access method for the external attachment LU. Specifically, this determination is made by checking whether or not an external attachment LU exists based on the mapping storage information 7235 of the LU management table 723 of the first storage apparatus 10, while checking whether or not an external attachment LU exists for which operation can be switched to the operation by the direct access method based on the shift allowed/not allowed determination information management table 424. For example, in the case where even one "not allowed" item exists in the shift allowed/not allowed determination information management table 424, the management apparatus 30 determines that the external attachment LU cannot be switched.

In the case where a switchable external attachment LU exists (S3513: YES), the flow proceeds to S3514, otherwise (S3513: NO), the flow returns to S3511.

In S3514, the management apparatus 30 acquires one or more switchable external attachment LUs, then, for each of the acquired external attachment LUs, performs path switching processing (hereinafter referred to as path switching processing S3600) needed to switch to the operation by the direct access method. After the path switching processing S3600 is performed, the flow returns to S3511.

FIG. 36 is a flowchart illustrating the detail of the path switching processing S3600. In the following, the flowchart is described with reference to FIG. 36.

First, the management apparatus 30 orders the first storage apparatus 10 to stop the use of the cache memory (CM 145) for data I/O related to the external attachment LUs to be switched, while transmitting an instruction to destage the data held in the cache memory (CM 145) (S3611).

The first storage apparatus 10, when receiving the above-mentioned instruction, refers to the LU management table 723 of the first storage apparatus 10, and identifies the logical devices included in the external attachment LUs to be switched, then "OFF" is set to the cache mode 7225 of the above-mentioned identified logical device in the logical device management table 722. Also, the first storage apparatus 10 refers to the cache management table 724, and destages the data held in the cache memory (CM 145) for the above-mentioned identified logical device (S3612). The first storage apparatus 10, when completing the setting of the above-mentioned cache mode 7225 and the above-mentioned destaging, notifies the completion to the management apparatus 30 (S3613).

The management apparatus 30, when receiving the above-mentioned notification, transmits an instruction to abort the application 314 which uses any external attachment LU to be switched (S3621). The host computer 3, when receiving the above-mentioned instruction, aborts the application 314 which uses any external attachment LU to be switched (S3622).

Next, the management apparatus 30 transmits an instruction to the first storage apparatus 10 to release the external attachment of the external attachment LU to be switched (S3631). The first storage apparatus 10, when receiving the above-mentioned instruction, deletes the mapping storage information 7235 of the above-mentioned external attachment LU in the LU management table 723 (S3632).

Next, the management apparatus 30 transmits an instruction to the switch 4 to change the zoning setting so that the host computer 3 can directly access the entity storage LU in which the entity of the above-mentioned external attachment LU of the second storage apparatus 10 has been stored (S3641). The switch 4, when receiving the above-mentioned instruction, updates the content of the zoning setting table 3300 of the switch 4 so that the above-mentioned direct access can be made (S3642).

Next, the management apparatus 30 transmits to the host computer 3 an instruction (hereinafter referred to as a path switching instruction) to change the path whose destination is set as the external attachment LU of the first storage apparatus 10 to another path whose destination is the entity storage LU of the second storage apparatus 10 (S3651). Also, the management apparatus 30 registers transmission history of path switching instructions to the path switching history management table 425 (S3652).

The host computer 3, when receiving the above-mentioned path switching instruction, disables setup of path whose destination is an external attachment LU in the path management table 321, while registering the path whose destination is the entity storage LU to the path management table 321 (S3653).

Next, the management apparatus 30 transmits an instruction to the host computer 3 to resume the operation of the application 314 which has been aborted in S3621 (S3661). The host computer 3, when receiving the above-mentioned instruction, resumes the operation of the aborted application 314 (S3662).

As described above, while the operation by external attachment is performed in the first storage apparatus 10 and the second storage apparatus 10, the management apparatus 30 monitors the performance of the first storage apparatus 10 as needed. The management apparatus 30, when detecting a problem in the performance of the first storage apparatus 10, determines whether or not the external attachment can be stopped. In the case where the external attachment can be stopped, the management apparatus 30 stops the operation of the external attachment and switches the operation to the operation by the direct access method. Consequently, the first storage apparatus 10 does not need to perform the processing which is to be performed in the operation by external attachment (processing performed by the external attachment mapping processing part 712), and accordingly the load of the first storage apparatus 10 is reduced, and improvement in the performance of the first storage apparatus 10 is achieved. In addition, after the operation is switched to the operation by the direct access method, the second storage apparatus 10 directly receives and processes a data I/O request to the entity storage LU from the host computer 3, thus resources of the second storage apparatus 10 such as the communication port 1141 and the cache memory (CM 145) of the FEPK 11 of the second storage apparatus 10 can be used effectively.

Resumption of External Attachment

As described above, the management apparatus 30, after switching from the operation by external attachment to the operation by the direct access method, monitors the performance of the first storage apparatus 10 as needed, and the first storage apparatus 10, when detecting a problem in the performance of the first storage apparatus 10, resumes the operation by the external attachment.

FIG. 37 is a flowchart illustrating the processing performed (hereinafter referred to as external attachment resume processing S3700) mainly by the management apparatus 30 when the above-mentioned external attachment is resumed. In the following, the flowchart is described with reference to FIG. 37.

The management apparatus 30 acquires the performance information of the first storage apparatus 10 actively or passively as needed from the first storage apparatus 10 (S3711). The performance information acquired by the management apparatus 30 is managed (stored) in the port performance management table 421, the volume performance management table 422, and the cache performance management table 423.

The management apparatus 30 determines as needed whether or not there is any problem in the performance of the first storage apparatus 10 based on the acquired performance information (S3712), and in the case there is no problem in the performance (S3712: YES), the management apparatus 30 starts the processing subsequent to S3713.

Whether there is a problem in the performance is determined by checking, for example, based on the port performance management table 421, whether or not there exists a communication port 1141 for which the IOPS measured value 4214 exceeds the maximum IOPS 4213. Alternatively, based on the volume performance management table 422 for example, the determination is made by checking whether or not there exists a logical volume (LU) for which the IOPS measured value 4223 exceeds the IOPS threshold value 4224. Alternatively, based on the cache performance management table 423 for example, the determination is made by checking whether or not the cache utilization ratio 4232 exceeds the cache utilization ratio threshold value 4233.

In S3713, the management apparatus 30 determines whether there exists an entity storage LU under the operation by the direct access method (entity storage LU for which the operation by external attachment is not resumed yet after the operation by external attachment is switched to the operation by the direct access method), and yet the operation can be switched (resumed) to the operation by external attachment. Specifically, this determination is made by identifying the entity storage LU under the operation by the direct access method by referring to the path switching history management table 425, and by checking whether the operation for the above-mentioned identified entity storage LU can be switched (resumed) to the operation by external attachment based on the shift allowed/not allowed determination information management table 424.

In the case where there exists an entity storage LU for which the operation can be switched (resumed) (S3713: YES), the flow proceeds to S3714, otherwise (S3713: NO), the flow returns to S3711.

In S3714, the management apparatus 30 acquires one entity storage LU, for which the operation can be switched (resumed), performs path switching processing (hereinafter referred to as path switch back processing S3800) needed to switch (resume) to the operation by the direct access method for each acquired entity storage LU. After the path switch back processing S3800 is performed, the flow returns to S3711.

FIGS. 38 and 39 are flowcharts illustrating the detail of the path switch back processing S3800. In the following, the flowcharts are described with reference to these figures.

As shown in FIG. 38, first, the management apparatus 30 transmits an acquisition request to the second storage apparatus 10 for the specific information of the entity storage LU acquired in S3714 (S3811). The acquisition request for specific information is made by transmitting an Inquiry command in SCSI standard from the management apparatus 30 to the second storage apparatus 10.

In response to the above-mentioned request, the second storage apparatus 10 transmits the specific information of the entity storage LU to the management apparatus 30 (S3812), then the management apparatus 30 receives the transmitted specific information (S3813).

Next, the management apparatus 30 transmits an instruction for the first storage apparatus 10 to make needed setting for external attachment, along with the storage ID of the second storage apparatus 10 in which the entity storage LU exists, the LUN of the entity storage LU, and the received specific information (S3821).

The first storage apparatus 10, when receiving the above-mentioned instruction, registers the storage ID, the LUN of the entity storage LU, and the specific information, which are transmitted from the management apparatus 30, to the LU management table 723 of the first storage apparatus 10 (S3822). Specifically, the received specific information is set to the specific information 7234 of the record of the logical volume (LU) for which external attachment is resumed, then the storage ID and the LUN of the entity storage LU that have been sent from the management apparatus 30 are registered to the mapping storage information 7235.

Next, the management apparatus 30 orders the second storage apparatus 10 to stop the use of the cache memory (CM 145) for data I/O related to the entity storage LU acquired in S3714, while transmitting an instruction to destage the data held in the cache memory (CM 145) (S3831).

The second storage apparatus 10, when receiving the above-mentioned instruction, refers to the LU management table 763, and identifies the logical devices included in the entity storage LU acquired in S3714, then "OFF" is set to the cache mode 7625 of the above-mentioned identified logical device in the logical device management table 762. Also, the second storage apparatus 10 refers to the cache management table 764, and destages the data held in the cache memory (CM 145) for the above-mentioned identified logical device (S3832). The second storage apparatus 10, when completing the setting of the above-mentioned cache mode 7225 and the above-mentioned destaging, notifies the completion to the management apparatus 30 (S3833).

Next, the management apparatus 30 transmits an instruction to the host computer 3 to abort the application 314 which uses any entity storage LU acquired in S3714 (S3841). The host computer 3, when receiving the above-mentioned instruction, aborts the application 314 which uses any entity storage LU acquired in S3714 (S3842).

Next, the management apparatus 30 transmits an instruction to the switch 4 to change the zoning setting so that the host computer 3 can access the logical volume (LU) of the first storage apparatus 10, for which external attachment is resumed (S3851). The switch 4, when receiving the above-mentioned instruction, updates the content of the zoning setting table 3300 of the switch 4 so that the above-mentioned access can be made (S3852).

As shown in FIG. 39, the management apparatus 30 then transmits to the host computer 3 an instruction (hereinafter referred to as a path switch back instruction) to change the path whose destination is set as the entity storage LU of the second storage apparatus 10 to another path whose destination is the logical volume (LU) of the first storage apparatus 10, for which external attachment is resumed (S3861). Also, the management apparatus 30 registers transmission history of path switch back instructions to the path switching history management table 425 (S3862).

The host computer 3, when receiving the above-mentioned path switch back instruction, disables setup of path whose destination is an entity storage LU in the path management table 321, while registering the path whose destination is the logical volume (LU) for which external attachment is resumed, to the path management table 321 (S3863).

Next, the management apparatus 30 transmits an instruction to the host computer 3 to resume the operation of the application 314 which has been aborted in S3841 (S3671). The host computer 3, when receiving the above-mentioned instruction, resumes the operation of the aborted application 314 (S3672).

As described above, management apparatus 30, when detecting that the performance problem of the first storage apparatus 10 is solved, determines whether or not the operation by external attachment can be resumed, and when possible, the operation is resumed. In this manner, when the performance of the first storage apparatus 10 is recovered, the operation by external attachment is resumed, thus effects due to external attachment can be enjoyed again (for example, high processing performance of the first storage apparatus 10 can be utilized). Thus those functions which are provided in only the first storage apparatus 10 (for example, the functions provided in only a newest model in the case where the first storage apparatus 10 is a newest model) can be provided to the host computer 3 again.

Second Embodiment

In the first embodiment, by stopping or resuming the external attachment for externally coupled logical volume (LU), the performance of the first storage apparatus 10 is subject to be adjusted, however, in the second embodiment, by migrating the logical volume (LU) whose entity is in the first storage apparatus 10 to the second storage apparatus 10, the performance of the first storage apparatus 10 is subject to be adjusted. In the following description, the basic configuration of the storage system 1 is the same as in the first embodiment.

FIG. 40 is a flowchart illustrating the processing, described as the second embodiment, performed mainly by the management apparatus 30 (hereinafter referred to as performance monitoring processing S4000) when the performance of the first storage apparatus 10 is monitored. In the following, the flowchart is described with reference to FIG. 40.

The management apparatus 30 acquires the performance information of the first storage apparatus 10 actively or passively as needed from the first storage apparatus 10 (S4011). The performance information acquired by the management apparatus 30 is managed (stored) in the port performance management table 421, the volume performance management table 422, and the cache performance management table 423.

The management apparatus 30 determines as needed whether or not there is any problem in the performance of the first storage apparatus 10 based on the acquired performance information (S4012), and in the case there is a problem in the performance (S4012: YES), the management apparatus 30 starts the processing subsequent to S4013.

Whether there is a problem in the performance is determined by checking, for example, based on the port performance management table 421, whether or not there exists a communication port 1141 for which the IOPS measured value 4214 exceeds the maximum IOPS 4213. Alternatively, based on the volume performance management table 422 for example, the determination is made by checking whether or not there exists a logical volume (LU) for which the IOPS measured value 4223 exceeds the IOPS threshold value 4224.

Alternatively, based on the cache performance management table 423 for example, the determination is made by checking whether or not the cache utilization ratio 4232 exceeds the cache utilization ratio threshold value 4233.

In S4013, the management apparatus 30 determines whether there exists a logical volume (LU) in the first storage apparatus 10, which can be migrated to the second storage apparatus 10. Specifically, this determination is made based on the shift allowed/not allowed determination information management table 424, and, for example, even one "not allowed" item exists in the shift allowed/not allowed determination information management table 424, it is determined that the logical volume (LU) cannot be migrated to the second storage apparatus 10. In the case there exists a logical volume (LU) which can be migrated to the second storage apparatus 10 (S4013: YES), the flow proceeds to S4014, otherwise (S4013: NO), the flow returns to S4011.

In S4014, the management apparatus 30 acquires one or more logical volumes (LU) which can be migrated to the second storage apparatus 10. Then for each acquired logical volume (LU) (hereinafter referred to as a migration source LU), path switching processing (hereinafter referred to as path switching processing S4100) needed for the migration to the second storage apparatus 10 is performed. After the path switching processing S4100 is performed, the flow returns to S4011.

FIGS. 41 and 42 are flowcharts illustrating the detail of the path switching processing S4100. In the following, the flowcharts are described with reference to these figures.

As shown in FIG. 41, first, the management apparatus 30 transmits an instruction to the second storage apparatus 10, the instruction for creating the logical volume (LU) (hereinafter referred to as a migration destination LU) for which the entity of the migration source LU is stored in the second storage apparatus 10 (S4111).

The second storage apparatus 10, when receiving the above-mentioned creation instruction, creates a migration destination LU, and registers the information of the created migration destination LU to the LU management table 763 of the second storage apparatus 10 (S4112).

Next, the management apparatus 30 instructs the first storage apparatus 10 to duplicate the data stored in the migration source LU to the migration destination LU (S4121). The first storage apparatus 10, when receiving the above-mentioned instruction, duplicates the data stored in the migration source LU to the migration destination LU via the storage area network (S4122).

Next, the management apparatus 30 orders the first storage apparatus 10 to stop the use of the cache memory (CM 145) for data I/O related to the migration source LU, while transmitting an instruction to destage the data held in the cache memory (CM 145) (S4131).

The first storage apparatus 10, when receiving the above-mentioned instruction, refers to the LU management table 723, and identifies the logical devices included in the migration source LU, then "OFF" is set to the cache mode 7225 of the above-mentioned identified logical device in the logical device management table 722. Also, the first storage apparatus 10 refers to the cache management table 724, and destages the data held in the cache memory (CM 145) for the above-mentioned identified logical device (S4132). The first storage apparatus 10, when completing the setting of the above-mentioned cache mode 7225 and the above-mentioned destaging, notifies the completion to the management apparatus 30 (S4133).

Next, the management apparatus 30 transmits an instruction to the host computer 3 to abort the application 314 which uses the migration source LU (S4141). The host computer 3, when receiving the above-mentioned instruction, aborts the operation of the application 314 which uses the migration source LU (S4142).

Next, the management apparatus 30 transmits an instruction for the first storage apparatus 10 to transfer the specific information of duplication source LU to the second storage apparatus 10 (S4151). The first storage apparatus 10, when receiving the above-mentioned transfer instruction, transmits the specific information of duplication source LU to the second storage apparatus 10 (S4152). The second storage apparatus 10, when receiving the specific information, registers the received specific information to the specific information 7634 of the migration destination LU in the LU management table 763 of the second storage apparatus 10, which has been created in S4112.

As shown in FIG. 42, next the management apparatus 30 transmits an instruction to the switch 4 to change the zoning setting so that the host computer 3 can access the migration destination LU (S4161). The switch 4, when receiving the above-mentioned instruction, updates the content of the zoning setting table 3300 of the switch 4 so that the above-mentioned access can be made (S4162).

Next, the management apparatus 30 transmits to the host computer 3 an instruction (hereinafter referred to as a path switching instruction) to change the path whose destination is set as the migration source LU of the first storage apparatus 10 to another path whose destination is the migration destination LU of the second storage apparatus 10 (S4171).

The host computer 3, when receiving the above-mentioned path switching instruction, disables setup of path whose destination is an entity storage LU in the path management table 321, while registering the path whose destination is the logical volume (LU) for which external attachment is resumed, to the path management table 321 (S4172).

Next, the management apparatus 30 transmits an instruction to the host computer 3 to resume the operation of the application 314 which has been aborted in S4141 (S4181). The host computer 3, when receiving the above-mentioned instruction, resumes the operation of the aborted application (S4182).

As described above, performance adjustment of the first storage apparatus 10 can also be made by migrating the entity of the logical volume (LU) existing in the first storage apparatus 10 to the second storage apparatus 10. In the case where a problem occurs in the performance of the first storage apparatus 10, for example, depending on the size of load or the type of load applied to the first storage apparatus 10 (load of the communication port 1141, I/O load of the logical volume (LU), load of the cache memory (CM 145) (usage ratio)), the management apparatus 30 may automatically (or by receiving operation from an operator manually) select either one of the method in the first embodiment and the method in the second embodiment.

Third Embodiment

The storage system 1 described as the third embodiment is assumed to include a plurality of storage apparatuses 10 corresponding to the first storage apparatus 10 in the first embodiment as shown in FIG. 43. In the third embodiment, in the case where a problem occurs in the performance of a certain first storage apparatus 10, the data of the logical volume (LU) of the certain first storage apparatus 10 is migrated to the logical volume (LU) of another first storage apparatus 10. Also, in the third embodiment, when the migration is performed, the logical volume (LU) of the other first storage apparatus 10 as the migration destination is temporarily handled in a changed operation mode by external attachment.

FIG. 44 is a flowchart illustrating the processing performed mainly by the management apparatus 30 (hereinafter referred to as performance monitoring processing S4400) when the performance of the first storage apparatus 10 is monitored in the storage system 1 described as the third embodiment. The performance monitoring processing S4400 is performed for each of the first storage apparatus 10 provided in the storage system 1. In the following, the flowchart is described with reference to FIG. 44.

The management apparatus 30 acquires the performance information of the first storage apparatus 10 actively or passively as needed from the first storage apparatus 10 (S4411). The performance information acquired by the management apparatus 30 is managed (stored) in the port performance management table 421, the volume performance management table 422, and the cache performance management table 423.

The management apparatus 30 determines as needed whether or not there is any problem in the performance of the first storage apparatus 10 based on the acquired performance information (S4412), and in the case there is a problem in the performance (S4412: YES), the management apparatus 30 starts the processing subsequent to S4413. Whether there is a problem in the performance is determined by checking, for example, based on the port performance management table 421, whether or not there exists a communication port 1141 for which the IOPS measured value 4214 exceeds the maximum IOPS 4213. Alternatively, based on the volume performance management table 422 for example, the determination is made by checking whether or not there exists a logical volume (LU) for which the IOPS measured value 4223 exceeds the IOPS threshold value 4224. Alternatively, based on the cache performance management table 423 for example, the determination is made by checking whether or not the cache utilization ratio 4232 exceeds the cache utilization ratio threshold value 4233.

In S4413, the management apparatus 30 determines whether there exists a logical volume (LU) in the first storage apparatus 10, which can be migrated to another first storage apparatus 10. Specifically, this determination is made based on the shift allowed/not allowed determination information management table 424, and, for example, even one "not allowed" item exists in the shift allowed/not allowed determination information management table 424, it is determined that the logical volume (LU) cannot be migrated to the other first storage apparatus 10. In the case there exists a logical volume (LU) which can be migrated to the other first storage apparatus 10 (S4413: YES), the flow proceeds to S4414, otherwise (S4413: NO), the flow returns to S4411.

In S4414, the management apparatus 30 acquires one or more logical volumes (LU) which can be migrated to another first storage apparatus 10. Then for each acquired logical volume (LU) (hereinafter referred to as a migration source LU), path switching processing (hereinafter referred to as path switching processing S4500) needed for the migration to the other first storage apparatus 10 is performed. After the path switching processing S4500 is performed, the flow returns to S4411.

FIG. 45 is a flowchart illustrating the detail of the path switching processing S4500.

In the following, the flowchart is described with reference to FIG. 45.

First, the management apparatus 30 selects another storage apparatus 10 (hereinafter referred to as a migration destination storage apparatus 10) to be migration destination (S4511). For this selection, the storage apparatus 10 having sufficient resources, for example, is selected with a higher priority. Specifically, based on the port performance management table 421, for example, the storage apparatus 10 having lower load of the communication port 1141 is selected with a higher priority. Alternatively, based on the volume performance management table 422, for example, the storage apparatus 10 having lower load of logical volume (LU) is selected with a higher priority. Alternatively, based on the cache performance management table 423, for example, the storage apparatus 10 having a lower cache utilization ratio 4232 is selected with a higher priority. Also, a use amount for a current storage area is acquired from each of the first storage apparatuses 10, and the storage apparatus 10 having lower open storage area is selected with a higher priority.

Next, for the other first selected storage apparatus 10, the management apparatus 30 starts the operation by external attachment assigning the entity storage LU to the migration source LU of the first storage apparatus 10 which is determined to have a problem in performance in S4412 (hereinafter referred to as a migration source storage apparatus 10). The start of the operation by external attachment is the same as that in the external attachment start processing S3400 which has been described with FIG. 34. The logical volume (LU) of the migration destination storage apparatus 10, for which the operation by the external attachment has started, is referred to as an external attachment LU hereinafter.

Next, the management apparatus 30 transmits an instruction for the migration destination storage apparatus 10 to stop the use of the cache memory (CM 145) for data I/O related to the external attachment LU (S4513). The migration destination storage apparatus 10, when receiving the above-mentioned instruction, refers to the LU management table 723 of the migration destination storage apparatus 10, and identifies the logical devices included in the external attachment LU to be switched, then "OFF" is set to the cache mode 7225 of the above-mentioned identified logical device in the logical device management table 722 (S4514).

Next, the management apparatus 30 transmits to the host computer 3 an instruction (hereinafter referred to as a path switching instruction) to change the path whose destination is set as the migration source LU of the migration source storage apparatus 10 to another path whose destination is the external attachment LU of the migration destination storage apparatus 10 (S4521).

The host computer 3, when receiving the above-mentioned path switching instruction, disables setup of path whose destination is the migration source LU of the migration source storage apparatus 10 in the path management table 321, while registering the path whose destination is the external attachment LU of the migration destination storage apparatus 10, to the path management table 321 (S4522).

Next, the management apparatus 30 transmits an instruction for the migration destination storage apparatus 10 to resume the use of the cache memory (CM 145) for data I/O related to external attachment LU (S4531). The migration destination storage apparatus 10, when receiving the above-mentioned instruction, refers to the LU management table 723 of the migration destination storage apparatus 10, and identifies the logical device included in the external attachment LU to be switched, then "ON" is set to the cache mode 7225 of the above-mentioned identified logical device in the logical device management table 722 (S4532). The reason for stopping the use of the cache memory (CM 145) for data I/O related to the external attachment LU in S4513 is because to prevent such a time period in which the cache memories (CM 145) for both of the migration source storage apparatus 10 and the migration destination storage apparatus 10 function simultaneously, which may cause inconsistency of data.

Next, the management apparatus 30 transmits an instruction for the migration destination storage apparatus 10 to duplicate the content of the logical device included in the migration source LU to the logical device which exists in the migration destination LU (S4541). According to the above-mentioned instruction, the migration destination storage apparatus 10 duplicates the content of the logical device included in the migration source LU to the logical device (hereinafter referred to as a duplication destination logical device) held by the migration destination storage apparatus 10 (S4542), and when the duplication is completed, the completion is notified to the management apparatus 30 (S4543). The management apparatus 30 identifies the logical device included in the migration source LU from the LU management table 723 of the migration source storage apparatus 10, and the logical device ID of the identified logical device is notified to the migration destination storage apparatus 10.

The management apparatus 30, when receiving the notification of the completion of the duplication, subsequently transmits an instruction for the migration destination storage apparatus 10 to exchange the logical devices so that the logical device included in the external attachment LU becomes the duplication destination logical device (S4551). The migration destination storage apparatus 10, when receiving the above-mentioned instruction, updates the content of the LU management table 723 of the migration destination storage apparatus 10 so that the logical device included in the external attachment LU becomes the duplication destination logical device (S4552).

In this manner, in the case where a problem occurs in the performance of a certain first storage apparatus 10 in the third embodiment, the data of the logical volume (LU) of the certain first storage apparatus 10 is migrated to the logical volume (LU) of another first storage apparatus 10. When the migration is performed, the logical volume (LU) of the other first storage apparatus 10 as the migration destination is temporarily handled in the operation mode by external attachment. The processing for starting the operation by external attachment does not involve data duplication of the logical volume (LU), thus the processing can be completed in a short period of time. Accordingly, processing from the migration source storage apparatus 10 which has a problem in performance can be released in a short time period, thus load of the migration source storage apparatus 10 can be reduced.

Fourth Embodiment

The fourth embodiment is assumed to have the configuration as in the first embodiment, and is related to the timing of starting the operation by external attachment in the first embodiment. In the first embodiment, it is determined whether or not there is a problem in performance of the first storage apparatus 10 (S3512 in FIG. 35), and in the condition that there is a problem in performance of the first storage apparatus 10, processing related to external attachment is started (shift processing in S3513). In the fourth embodiment, however, an access frequency of the logical volume (LU) of the first storage apparatus 10 is monitored, and whether or not the operation by external attachment is performed is determined according to the access frequency.

FIGS. 46 and 47 show the tables that are managed (stored) by the management apparatus 30 in the fourth embodiment (hereinafter the table shown in FIG. 46 is referred to as an LU access frequency management table 4600, and the table shown in FIG. 47 is referred to as a tier management table 4700).

The LU access frequency management table 4600 shown in FIG. 46 manages an access frequency for the logical volume (LU) of each storage apparatus 10 (the number of occurrences of data I/O request per unit time (1 day)). As shown in the figure, the LU access frequency management table 4600 includes one or more records including the items of a storage ID 4611, a LUN 4612, and an access frequency 4613.

Among these, the storage ID 4611 is set with a storage ID. The LUN 4612 is set with the LUN of the logical volume (LU) (including an external attachment LU) in which the storage apparatus 10 receives access from the host computer 3. The access frequency 4613 manages the access frequency of the logical volume (LU) of each storage apparatus 10. The management apparatus 30 acquires the content of the access frequency 4613 actively or passively as needed from the storage apparatus 10.

The tier management table 4700 shown in FIG. 47 manages information as the decision criterion for determining the operation mode for the logical volume (LU) according to an access frequency. As shown in the figure, the tier management table 4700 includes one or more records including the items of a tier ID 4711, an access frequency upper limit 4712 and an access frequency lower limit 4713.

Among these, the tier ID 4711 is set with an identifier (hereinafter referred to as a tier ID) assigned to each operation mode (hereinafter referred to as a tier) for the logical volume (LU). Also, the access frequency upper limit 4712 is set with an upper limit of the access frequency of the logical volume (LU) for the tier. Also, the access frequency lower limit 4713 is set with a lower limit of the access frequency of the logical volume (LU) for the tier.

As shown in FIG. 47, 3 tiers (a first tier, a second tier, and a third tier) are set as the operation modes for the logical volume (LU) in this example. As the operation mode for each tier, for example, the operation mode in which the entity of data is managed in the first storage apparatus 10, the operation mode in which management is made as the above-described external attachment LU (the entity of data is managed in the second storage apparatus 10), and the operation mode by the direct access method described above are available. In the present embodiment, it is assumed that the first tier (high access frequency) corresponds to the operation mode in which the entity of data is managed in the first storage apparatus 10, and the second tier (medium access frequency) corresponds to the operation mode in which management is made as the external attachment LU, and the third tier (low access frequency) corresponds to the operation mode by the direct access method.

The management apparatus 30 in the fourth embodiment compares the access frequency of each logical volume (LU) of the LU access frequency management table 4600 with the tier management table 4700 as needed. In the case where the operation mode currently applied to a certain logical volume (LU), and the operation mode corresponding to the access frequency of the logical volume (LU) (the operation mode defined in the tier management table 4700 for the access frequency) are different, the operation mode for the logical volume (LU) is changed to another operation mode which corresponds to the access frequency. And in the case where the operation mode is changed from that of the second tier to that of the third tier, processing subsequent to S3513 in FIG. 35 described in the first embodiment is performed. Also, in the case where the operation mode is changed from that of the third tier to that of the second tier, processing subsequent to S3713 in FIG. 37 described in the first embodiment is performed.

In the case where the storage system 1 has a mechanism of determining an operation mode (tier) for the logical volume (LU) according to the access frequency like this, the operation mode by external attachment and the operation mode by the direct access method described in the first embodiment each can be made one of tiers. In this case, migration between the tiers can be performed by the method described in the first embodiment, thus the performance of the first storage apparatus 10 can be improved.

In the above, the embodiments have been described, but the above-described embodiments are provided to facilitate the understanding of the present invention, and not intended to be interpreted to limit the present invention. The present invention may be modified, improved without departing from its spirit, and the equivalent embodiments are also included in the present invention.

For example, in the above description, at the timing of occurrence of a problem in performance of the first storage apparatus 10, the operation by external attachment is stopped and the operation is switched to the direct access method. However, at the timing of operation on the management apparatus 30 by an operator, for example, the above-mentioned switching may be made. Also, at the timing of a predetermined operation on the management apparatus 30 by an operator, the processing for resumption of external attachment may be started.

Also, in the above description, only the performance of the first storage apparatus 10 is monitored to determine whether or not the above-mentioned switching is made, however, the performance of the second storage apparatus 10 may be monitored, and based on the combined information of the both performance of the first storage apparatus 10 and the second storage apparatus 10 whether or not the above-mentioned switching is made may be determined.

The invention claimed is:

1. A storage system comprising:
a first storage apparatus that is data I/O for at least one first logical volume configured by using a storage area of a storage device in accordance with a first data I/O request sent from an external device; a second storage apparatus that performs data I/O for at least one second logical volume configured using a storage area of a storage device in accordance with the data I/O request sent from the external device; and
a management apparatus that is an information processing apparatus communicatively coupled to each of the external device, the first storage apparatus, and the second storage apparatus,
the storage system performing external attachment processing, in which the first storage apparatus stores associations between the first logical volume and the second logical volume in which an entity of data of the first logical volume is stored; upon receipt of the first data I/O request for the first logical volume from the external device, the first storage apparatus transmits a second data I/O request to the second storage apparatus, the second data I/O request being directed to the second logical volume associated with the first logical volume; upon receipt of the second data I/O request, the second storage apparatus performs data I/O for the second logical volume and transmits a response thereto to the first storage apparatus; and, upon receipt of the response, the first storage apparatus transmits a response to the first data I/O request to the external device; and the storage system performing external attachment release processing, in which the management apparatus transmits an instruction to the first storage apparatus to release the association between the first logical volume and the second logical volume, and transmits an instruction to the external device to change a path of the first data I/O request directed to the first logical volume so that the first data I/O request is directly transmitted to the second logical volume as a destination;

wherein the storage system further performs external attachment resume processing, in which, after performing the external attachment release processing, the management apparatus acquires the performance information; the management apparatus determines whether or not the external attachment processing is resumed for the first logical volume based on the performance information; in a case where the external attachment processing is determined to be resumed, the management apparatus transmits an external attachment start instruction to the first storage apparatus, the external attachment start instruction ordering the first storage apparatus to store an association between the first logical volume and the second logical volume; and the management apparatus transmits an instruction to the external device to change a path of the first data I/O request directed to the second logical volume so that the first data I/O request is transmitted to the first logical volume as destination.

2. The storage system according to claim 1, wherein the management apparatus acquires performance information that is information on performance of the first storage apparatus, and determines whether or not the external attachment release processing is to be performed based on the performance information.

3. The storage system according to claim 2, wherein the performance information is at least one of a load on a communication port used for transmission and reception of the first data I/O request of the first storage apparatus; an access frequency to the first logical volume; and a utilization ratio of a cache memory included in the first storage apparatus.

4. The storage system according to claim 1, wherein, for each first logical volume, the management apparatus manages, as shift allowed/not allowed determination information, at least one of: whether or not reception of a data I/O request can be stopped; whether or not a path for accessing from the external device to the first logical volume or the second logical volume can be changed; whether or not a service provided by the first storage apparatus to the external device can be stopped; and whether or not an operation of backup can be changed, and the management apparatus determines whether or not the external attachment release processing is to be performed based on the shift allowed/not allowed determination information.

5. The storage system according to claim 4, wherein the service provided by the first storage apparatus to the external device is at least one of a service related to a thin provisioning, a service related to duplication management function (local copy), and a service related to remote duplication function (remote copy).

6. The storage system according to claim 1, wherein
the first storage apparatus includes a cache memory where data related to a data I/O for the first logical volume is temporarily stored, and when performing the external attachment release processing, the management apparatus transmits to the first storage apparatus an instruction to destage data in the cache memory.

7. The storage system according to claim 1, wherein
the external device, the first logical volume, and the second logical volume are communicatively coupled to each other via a storage area network configured by using a switch capable of setting zoning,
the management apparatus is communicatively coupled to the switch, and
when changing the operation mode, the management apparatus sets zoning for the switch so that the external device can directly access the second logical volume.

8. The storage system according to claim 1, wherein the performance information is at least one of a load of a communication port used for transmission and reception of the first data I/O request of the first storage apparatus; an access frequency to the first logical volume; and a utilization ratio of a cache memory included in the first storage apparatus.

9. The storage system according to claim 1, wherein
when performing the external attachment resume processing, the management apparatus acquires specific information of the second logical volume from the second storage apparatus, and transmits an instruction to the first storage apparatus to store the acquired specific information while associating the acquired specific information with the first logical volume, and
the first storage apparatus stores the specific information while associating the specific information with the first logical volume in accordance with the instruction.

10. The storage system according to claim 1, wherein
the first storage apparatus includes:
 one or more front end packages having a circuit for communicating with the external device;
 one or more back end packages having a circuit for communicating with the storage device;
 one or more processor packages having the processor and a data transfer device; and
 one or more main packages having the memory and the cache memory.

11. A method of controlling a storage system including
a first storage apparatus that performs data I/O for at least one first logical volume configured by using a storage area of a storage device in accordance with a first data I/O request sent from an external device,
a second storage apparatus that performs data I/O for at least one second logical volume configured using a storage area of a storage device in accordance with the data I/O request sent from the external device, and
a management apparatus that is an information processing apparatus communicatively coupled to each of the external device, the first storage apparatus, and the second storage apparatus,
the method comprising:
 performing external attachment processing, in which the first storage apparatus stores associations between the first logical volume and the second logical volume in which entity of data of the first logical volume is stored; upon receipt of the first data I/O request for the first logical volume from the external device, the first storage apparatus transmits a second data I/O request to the second storage apparatus, the second data I/O request being directed to the second logical volume associated with the first logical volume; upon receipt of the second data I/O request, the second storage apparatus performs data I/O for the second logical volume and transmits a response thereto to the first storage apparatus; and, upon receipt of the response, the first storage apparatus transmits a response to the first data I/O request to the external device; and
 performing external attachment release processing in which, the management apparatus transmits a instruction to the first storage apparatus to release the association between the first logical volume and the second logical volume, and transmits an instruction to the external device to change a path of the first data I/O request directed to the first logical volume so that the first data I/O request is directly transmitted to the second logical volume as a destination; and
 performing external attachment resume processing, in which, after performing the external attachment release processing, the management apparatus acquires the performance information; the management apparatus determines whether or not the external attachment processing is resumed for the first logical volume based on the performance information; in a case where the external attachment processing is determined to be resumed, the management apparatus transmits an external attachment start instruction to the first storage apparatus, the external attachment start instruction ordering the first storage apparatus to store an association between the first logical volume and the second logical volume; and the management apparatus transmits an instruction to the external device to change a path of the first data I/O request directed to the second logical volume so that the first data I/O request is transmitted to the first logical volume as destination.

12. The method of controlling the storage system according to claim 11, further including a step of causing the management apparatus to acquire performance information that is information on performance of the first storage apparatus, and to determine whether or not the external attachment release processing is to be performed based on the performance information.

13. The method of controlling the storage system according to claim 11, wherein the performance information is at least one of a load of a communication port used for transmission and reception of the first data I/O request of the first storage apparatus; an access frequency to the first logical volume; and a utilization ratio of a cache memory included in the first storage apparatus.

* * * * *